(12) United States Patent
Wallrabenstein

(10) Patent No.: US 9,806,718 B2
(45) Date of Patent: Oct. 31, 2017

(54) AUTHENTICATABLE DEVICE WITH RECONFIGURABLE PHYSICAL UNCLONABLE FUNCTIONS

(71) Applicant: Analog Devices, Inc., Norwood, MA (US)

(72) Inventor: John Ross Wallrabenstein, West Lafayette, IN (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 15/176,766

(22) Filed: Jun. 8, 2016

(65) Prior Publication Data
US 2017/0149572 A1 May 25, 2017

Related U.S. Application Data

(63) Continuation-in-part of application No. 14/746,054, filed on Jun. 22, 2015, which is a continuation-in-part of application No. 14/704,914, filed on May 5, 2015.
(Continued)

(51) Int. Cl.
*H03K 19/177* (2006.01)
*H04L 9/08* (2006.01)

(52) U.S. Cl.
CPC ..... *H03K 19/17748* (2013.01); *H04L 9/0866* (2013.01)

(58) Field of Classification Search
CPC ............... H04L 2209/80; H04L 9/0866; H04L 9/3271; H03K 19/17748; G06F 21/70
See application file for complete search history.

(56) References Cited

U.S. PATENT DOCUMENTS

| 8,446,250 B2* | 5/2013 | Kursawe | G06F 21/602 340/10.1 |
| 8,458,489 B2* | 6/2013 | Beckmann | G06F 9/455 713/189 |

(Continued)

FOREIGN PATENT DOCUMENTS

EP     2 320 344 A2     7/2011

OTHER PUBLICATIONS

Majzoobi et al., "Techniques for Design and Implementation of Secure Reconfigurable PUFs," ACM Transactions on Reconfigurable Technology Systems, 2:1, pp. 5:1-5:33 (2009).
(Continued)

*Primary Examiner* — Oleg Korsak
(74) *Attorney, Agent, or Firm* — Wolf, Greenfield & Sacks, P.C.

(57) ABSTRACT

An authenticatable device according to one embodiment includes a reconfigurable physical unclonable function ('RPUF') used with one parameter to recover sensitive values (e.g., a secret or a share of a secret) and a different parameter to encode and store values (e.g., challenge-helper pairs) correlated to the sensitive values. In another embodiment, a pair of RPUFs is used instead of a single PUF, with one RPUF used to recover sensitive values and the other RPUF used to encode and store correlated values. In still another embodiment, the desired expiration of values can be enforced by employing redundant RPUFs; when the device is powered on, one (or more than one, but less than all) of the RPUFs is selected and transitioned to a new configuration, invalidating any correlated values previously constructed using the old configuration, and the RPUF that was not reconfigured is used to recover the sensitive value(s) using the remaining correlated value(s).

20 Claims, 15 Drawing Sheets

Related U.S. Application Data

(60) Provisional application No. 61/988,848, filed on May 5, 2014, provisional application No. 62/128,920, filed on Mar. 5, 2015, provisional application No. 62/150,586, filed on Apr. 21, 2015.

(56) References Cited

U.S. PATENT DOCUMENTS

| | | | | |
|---|---|---|---|---|
| 8,912,817 | B2* | 12/2014 | Wang | H03K 19/17768 326/38 |
| 8,918,647 | B1* | 12/2014 | Wallrabenstein | H04L 63/0853 713/159 |
| 2006/0023887 | A1 | 2/2006 | Agrawal et al. | |
| 2006/0045262 | A1 | 3/2006 | Orlando | |
| 2009/0083833 | A1 | 3/2009 | Ziola et al. | |
| 2010/0176920 | A1 | 7/2010 | Kursawe et al. | |
| 2012/0183135 | A1 | 7/2012 | Paral et al. | |
| 2013/0246809 | A1 | 9/2013 | Beckmann et al. | |
| 2014/0140513 | A1 | 5/2014 | Brightley et al. | |

OTHER PUBLICATIONS

Kursawe et al., "Reconfigurable Physical Unclonable Functions—Enabling technology for tamper-resistant storage," Hardware-Oriented Security and Trust, HOST '09, IEEE International Workshop, pp. 22-29 (2009).

Katzenbeisser et al., "Recyclable PUFs: logically reconfigurable PUFs," Journal of Cryptographic Engineering, 1:3, pp. 177-186 (2011).

Eichhorn et al., "Logically Reconfigurable PUFs: Memory-based Secure Key Storage," Proceedings of the Sixth ACM Workshop on Scalable Trusted Computing, STC '11, pp. 59-64 (ACM 2011).

Maes et al., "Intrinsic PUFs from flip-flops on reconfigurable devices," 3rd Benelux workshop on information and system security (WISSec 2008), vol. 17.

Zhang et al., "Exploiting Process Variations and Programming Sensitivity of Phase Change Memory for Reconfigurable Physical Unclonable Functions," IEEE Transactions on Information Forensics and Security, vol. 9, No. 6, pp. 921-932 (2014).

Horstmeyer et al., "Physically secure and fully reconfigurable data storage using optical scattering," IEEE International Symposium on Hardware Oriented Security and Trust (HOST), pp. 157-162 (2015).

Lao et al., "Reconfigurable architectures for silicon physical unclonable functions," IEEE International conference on Electro/Information Technology (EIT), pp. 1-7 (2011).

International Search Report and Written Opinion dated Jun. 3, 2016 for Application No. PCT/US2016/021275.

Asaeda et al., Structuring Proactive Secret Sharing in Mobile Ad-hoc Networks. 2006 1st International Symposium on Wireless Pervasive Computing. Jan. 18, 2006. 6 pages.

* cited by examiner

AUTHENTICATABLE DEVICE WITH RECONFIGURABLE PHYSICAL UNCLONABLE FUNCTIONS

CROSS REFERENCE TO RELATED APPLICATIONS

This application is a continuation-in-part of U.S. patent application Ser. No. 14/746,054 filed Jun. 22, 2015, which was in turn a continuation-in-part of Ser. No. 14/704,914 filed May 5, 2015, and claims the benefit of the priority of and incorporates by reference the contents of provisional U.S. Patent Applications Ser. No. 62/150,586 filed Apr. 21, 2015, Ser. No. 62/128,920 filed Mar. 5, 2015, and Ser. No. 61/988,848 filed May 5, 2014.

FIELD OF THE INVENTION

This disclosure relates generally to hardware verification, and in particular but not exclusively, to binding authentication to protect against tampering and subversion by substitution.

BACKGROUND OF THE INVENTION

The unique properties of PUFs provide several advantages to cryptographic constructions. In general, PUFs may provide some or all of three main advantages: (1) eliminating private key storage, (2) providing tamper detection, and (3) establishing a hardware root-of-trust. Private key storage can be eliminated by evaluating a PUF to dynamically regenerate a value unique to an identified piece of hardware having that PUF. As to tamper detection, a PUF's unclonable properties (e.g., wire delays, resistance) may be such that modification to the PUF irreversibly alters the PUF's mapping from challenges (inputs) to responses (outputs) after enrollment (however, not against malicious modifications before enrollment, e.g., Becker et al., "Stealthy Dopant-Level Hardware Trojans," *Cryptographic Hardware and Embedded Systems—CHES* 2013, volume 8086 of *Lecture Notes in Computer Science*, pages 197-214, Springer, 2013). These PUF properties may be used to produce a hardware-unique, tamper-protected value from which a hardware root-of-trust can be established.

Rührmair et al. ("Modeling Attacks on Physical Unclonable Functions," *Proceedings of the 17th ACM conference on Computer and communications security*, CCS '10, pages 237-249, ACM, 2010) define three distinct classes of PUF devices:

A Weak PUF is typically used only to derive a secret key. The challenge space may be limited, and the response space is assumed to never be revealed. Typical constructions include the SRAM (Holcomb et al., "Initial SRAM State as a Fingerprint and Source of True Random Numbers for RFID Tags," *In Proceedings of the Conference on RFID Security*, 2007), Butterfly (Kumar et al., "Extended abstract: The Butterfly PUF Protecting IP on Every FPGA," *IEEE International Workshop on Hardware-Oriented Security and Trust*, pages 67-70, 2008), Arbiter (Lee et al., "A technique to build a secret key in integrated circuits for identification and authentication applications," *IEEE Symposium on VLSI Circuits: Digest of Technical Papers*, pages 176-179, 2004), Ring Oscillator (Suh et al., "Physical Unclonable Functions for Device Authentication and Secret Key Generation," *Proceedings of the 44th annual Design Automation Conference*, DAC '07, pages 9-14, ACM, 2007), and Coating (Tuyls et al., "Read-Proof Hardware from Protective Coatings," *Proceedings of the 8th international conference on Cryptographic Hardware and Embedded Systems*, CHES'06, pages 369-383, Springer, 2006) PUFs.

A Strong PUF is assumed to be (i) physically impossible to clone, (ii) impossible to collect a complete set of challenge response pairs in a reasonable time (typically taken to be on the order of weeks), and (iii) difficult to predict the response to a random challenge. For example, the super-high information content (SHIC) PUF described by Rührmair ("Applications of High-Capacity Crossbar Memories in Cryptography," *IEEE Trans. Nanotechnol.*, volume 10, no. 3:489-498, 2011) may be considered a Strong PUF.

A Controlled PUF satisfies all of the criteria for strong PUFs, and additionally implements an auxiliary control unit capable of computing more advanced functionalities to cryptographically augment protocols.

PUF output is noisy in that it varies slightly despite evaluating the same input. This is generally addressed with fuzzy extraction, a method developed to eliminate noise in biometric measurements. (See Juels et al., "A Fuzzy Commitment Scheme," *Proceedings of the 6th ACM conference on Computer and Communications Security*, CCS '99, pages 28-36, ACM, 1999). Fuzzy extraction may in part be employed within a device having a PUF such as within an auxiliary control unit, such that the output is constant for a fixed input. Fuzzy extraction (or reverse fuzzy extraction) may for example employ a "secure sketch," as described by Juels et al. to store a sensitive value $p_i^{priv}$ to be reconstructed and a helper string helper$_i$ for recovering $p_i^{priv}$. A secure sketch SS for input string O, where ECC is a binary (n, k, 2t+1) error correcting code of length n capable of correcting t errors and $p_i^{priv} \leftarrow \{0, 1\}^k$ is a k-bit value, may for example be defined as $SS(O; p_i^{priv}) = O \oplus ECC(p_i^{priv})$. The original value V then may be reproduced given the helper string helper$_i$ and an input O' within a maximum Hamming distance t of O using a decoding scheme D for the error-correcting code ECC and O', as $D(helper_i \oplus O') = D(O \oplus ECC(p_i^{priv}) \oplus O') = p_i^{priv}$.

A physical unclonable function $P_d: \{0, 1\}_{\kappa_1} \mapsto \{0, 1\}_{\kappa_2}$ bound to a device d preferably exhibits the following properties:

1. Unclonability: $\Pr[\text{dist}(y, x) \leq t | x \leftarrow U_{\kappa_1}, y \leftarrow P(x), z \leftarrow P'] \leq \epsilon_1$, the probability of duplicating PUF P with a clone PUF P' such that their output distributions are t-statistically close is less than some sufficiently small $\epsilon_1$.

2. Unpredictability: It is desirable that an adversary cannot predict a device's PUF response r for a challenge c with more than negligible probability (at least without physical access to the device), and that helper data does not reveal anything to an adversary about PUF responses. Assuming that all entities are bound to probabilistic polynomial-time (PPT), i.e., can only efficiently perform computation requiring polynomially many operations with respect to a global security parameter λ (which refers to the number of bits in the relevant parameter), $\text{Adv}_\mathcal{A}^{PUF-PRED}(\kappa_2) = \Pr[r = r']$, denoting the probability of the adversary $\mathcal{A}$ guessing the correct response r of the PUF P to the challenge c, is preferably negligible in $\kappa_2$. This can be assessed, for example, through a game between an adversary $\mathcal{A}$ and a PUF device $P: \{0, 1\}_{\kappa_1} \mapsto \{0, 1\}_{\kappa_2}$ mapping input strings from the challenge space $C_P$ of length $\kappa_1$ to the response space $\mathcal{R}_p$ of length $\kappa_2$ where $\lambda$ is the security parameter for the protocol, given in unary as $1^\lambda$.

| PUF-PRED: PUF Prediction Game | | |
|---|---|---|
| Adversary $\mathcal{A}$ | | PUF Device P |
| (1) $c_i \in \bar{\mathcal{C}}_P \subset \mathcal{C}_P$, $0 \leq i \leq \text{poly}(\lambda)$ | $\rightarrow$ | |
| | $\leftarrow$ | $r_i = P(c_i) \in \bar{\mathcal{R}}_P$, (2) $\bar{\mathcal{R}}_P \subset \mathcal{R}_P$, $0 \leq i \leq \text{poly}(\lambda)$ |
| (3) Challenge $c \notin \bar{\mathcal{C}}_P$ | $\rightarrow$ | |
| (4) $c_i' \in \bar{\mathcal{C}}_P' \subset \mathcal{C}_P$, $c \notin \bar{\mathcal{C}}_P'$, $0 \leq i \leq \text{poly}(\lambda)$ | $\rightarrow$ | |
| | $\leftarrow$ | $r_i' = P(c_i') \in \bar{\mathcal{R}}_P'$, (5) $\bar{\mathcal{R}}_P' \subset \mathcal{R}_P$, $0 \leq i \leq \text{poly}(\lambda)$ |
| (6) Guess $r' \stackrel{?}{=} P(c)$ | $\rightarrow$ | |

The game proceeds as follows:

1. The adversary $\mathcal{A}$ issues polynomially many (w.r.t. the security parameter $\lambda$) challenges $c_i \in \bar{\mathcal{C}}_P$ to the PUF device P, where the challenge set $\bar{\mathcal{C}}_P$ is a proper subset of the entire challenge space $\mathcal{C}_p$.
2. The PUF device P returns the responses $\{r_i | r_i \leftarrow P(c_i)\}$ to $\mathcal{A}$.
3. The adversary $\mathcal{A}$ eventually outputs a challenge c that was not in the original set of challenge queries $\bar{\mathcal{C}}_P$. The adversary is not allowed to query the PUF device P on the committed challenge c.
4. The adversary $\mathcal{A}$ may once again issue a new set of polynomially many challenges $c_i' \in \bar{\mathcal{C}}_P'$ to the PUF device P. The adversary is not allowed to query the PUF device P on the committed challenge c.
5. The PUF device P returns the responses $\{r_i' | r_i' \leftarrow P(c_i')\}$ to $\mathcal{A}$.
6. The adversary $\mathcal{A}$ eventually outputs a guess $r'$ for P's response to the committed challenge c.

The adversary only wins the game when guess $r'$ is equal to P's actual response $r \leftarrow P(c)$ to $\mathcal{A}$'s committed challenge c. (As noted, the PUF's output is noisy and will vary slightly on any fixed input, so the equality is typically taken with respect to the output of a fuzzy extractor (e.g., Dodis et al., "Fuzzy Extractors: How to Generate Strong Keys from Biometrics and Other Noisy Data," *SIAM J. Comput.*, volume 38, no. 1:97-139, 2008)).

3. Robustness: $\Pr[\text{dist}(y, z) > t | x \leftarrow U_{\kappa_1}, y \leftarrow P(x), z \leftarrow P(x)] \leq \epsilon_2$, i.e., the probability of a fixed PUF P yielding responses t-distant on the same input x is less than some sufficiently small $\epsilon_2$.
4. Indistinguishability: The output of the PUF device (typically fuzzy extractor output) preferably is computationally indistinguishable from a random string of the same length l, such that a PPT adversary $\mathcal{A}$'s advantage $\text{Adv}\mathcal{A}^{PUF-IND}(l)$ is at most negligibly more than ½. The indistinguishability of a PUF can be assessed, for example, through a game in which an adversary $\mathcal{A}$ is asked to differentiate between the output r of the fuzzy extractor for a PUF P and a randomly chosen string $s \in \{0, 1\}^l$ of the same length l.

| PUF-IND: PUF Indistinguishability Game | | |
|---|---|---|
| Adversary $\mathcal{A}$ | | PUF Device P |
| (1) $c_i \in \mathcal{CH} \subset \mathcal{C}_P$, $0 \leq i \leq \text{poly}(\lambda)$ | $\rightarrow$ | $R_i \rightarrow \text{rand} \in \{0, 1\}^\lambda$ $H_i \leftarrow \text{ECC}(R_i) \oplus P(c)$ |
| | $\leftarrow$ | $H_i \in \bar{\mathcal{R}}_P \subset \mathcal{R}_P$, (2) $0 \leq i \leq \text{poly}(\lambda)$ |
| (3) $c_i \in \bar{\mathcal{CH}} \subset \mathcal{C}_P$, $0 \leq i \leq \text{poly}(\lambda)$ | $\rightarrow$ | |
| | $\leftarrow$ | $R_i \in \bar{\mathcal{R}}_P \subset \mathcal{R}_P$, (4) $0 \leq i \leq \text{poly}(\lambda)$ |
| (5) Challenge $c \notin \bar{\mathcal{CH}}$ | $\rightarrow$ | $b \in \{0, 1\}$ |
| | $\leftarrow$ | $b(s \in \{0, 1\}^l) +$ (6) $(1 - b)(R_i)$, $R_i = D(H_i \oplus P(c))$ |
| (7) $c_i' \in \mathcal{CH} \subset \mathcal{C}_P$, $c \neq c_i'$, $0 \leq i \leq \text{poly}(\lambda)$ | $\rightarrow$ | |
| | $\leftarrow$ | $R_i' \in \bar{\mathcal{R}}_P \subset \mathcal{R}_P$, (8) $0 \leq i \leq \text{poly}(\lambda)$ |
| (9) Guess $b' \stackrel{?}{=} b$ | $\rightarrow$ | |

This game proceeds as follows:

1. Adversary $\mathcal{A}$ executes the enrollment phase on any challenge $c_i \in \mathcal{C}_P$.
2. The PUF device returns the corresponding helper string $H_i$, which blinds the error corrected sensitive value $\text{ECC}(R_i)$ with the output of the PUF P(c). Denote this set of challenge-helper pairs $(c_i, H_i)$ as $\mathcal{CH}$.
3. Adversary $\mathcal{A}$ now requests the PUF response $r_i = P(c_i)$ for any $c_i \in \mathcal{CH}$. Denote the set of requested challenges in this step $\bar{\mathcal{CH}}$.
4. For all requests $c_i \in \bar{\mathcal{CH}}$, the PUF device returns the set $\{r_i | r_i \leftarrow P(c_i)\}$.
5. Adversary $\mathcal{A}$ selects a challenge $c \notin \bar{\mathcal{CH}}$, such that $\mathcal{A}$ has $H_i$ but not $R_i$ for c. The PUF device chooses a bit $b \in \{0, 1\}$ uniformly at random.
6. If b=0, $\mathcal{A}$ is given $R_i = D(H_i \oplus P(c))$. Otherwise, if b=1 then $\mathcal{A}$ is given a random string $s \in \{0, 1\}^l$.
7. Adversary $\mathcal{A}$ is allowed to query the PUF device for $c_i' \in \mathcal{CH}$ so long as no $c_i' = c$.
8. For all requests $c_i' \neq c$, the PUF device returns the set $\{r_i' | r_i' \leftarrow P(c_i')\}$.
9. The adversary outputs a guess bit $b'$, and succeeds when $b' = b$.

Related assessments of PUFs are provided by Hori et al., "Quantitative and Statistical Performance Evaluation of Arbiter Physical Unclonable Functions on FPGAs," 2010 *International Conference on Reconfigurable Computing and FPGAs (ReConFig)*, pages 298-303, 2010; Maiti, *A Systematic Approach to Design an Efficient Physical Unclonable Function*, dissertation, Virginia Tech, 2012, and others.

Literature on physical unclonable functions evaluates the properties of PUF hardware design (e.g., Gassend et al., "Silicon Physical Random Functions," *Proceedings of the 9th ACM conference on Computer and communications security*, CCS '02, pages 148-160, ACM, 2002; Katzenbeisser et al., "PUFs: Myth, Fact or Busted? A Security Evaluation of Physically Unclonable Functions (PUFs) Cast in Silicon," *Cryptographic Hardware and Embedded Systems—CHES '12*, pages 283-301, Springer, 2012; Ravikanth, Physical one-way functions, Ph.D. thesis, 2001; Rührmair et al., "Applications of High-Capacity Crossbar Memories in Cryptography," *IEEE Trans. Nanotechnol.*, volume 10, no. 3:489-498, 2011; Suh et al., "Physical Unclonable Functions for Device Authentication and Secret Key Generation," *Proceedings of the 44th annual Design Automation Conference*, DAC '07, pages 9-14, ACM, 2007; Yu et al., "Recombination of Physical Unclonable Functions," *GOMACTech*, 2010), provides formal theoretical models of PUF properties, and designs protocols around those definitions (cf. Armknecht et al., "A Formalization of the Security Features of Physical Functions," *Proceedings of the 2011 IEEE Symposium on Security and Privacy*, SP '11, pages 397-412, IEEE Computer Society, 2011; Brzuska et al., "Physically Uncloneable Functions in the Universal Composition Framework," *Advances in Cryptology—CRYPTO 2011—31st Annual Cryptology Conference*, volume 6841 of *Lecture Notes in Computer Science*, page 51, Springer, 2011; Frikken et al., "Robust Authentication using Physically Unclonable Functions," *Information Security*, volume 5735 of *Lecture Notes in Computer Science*, pages 262-277, Springer, 2009; Handschuh et al., "Hardware Intrinsic Security from Physically Unclonable Functions," *Towards Hardware-Intrinsic Security*, Information Security and Cryptography, pages 39-53, Springer, 2010; Kirkpatrick et al., "PUF ROKs: A Hardware Approach to Read-Once Keys," *Proceedings of the 6th ACM Symposium on Information, Computer and Communications Security*, ASIACCS '11, pages 155-164, ACM, 2011; Paral et al., "Reliable and Efficient PUF-based Key Generation using Pattern Matching," *IEEE International Symposium on Hardware-Oriented Security and Trust (HOST)*, pages 128-133, 2011; Rührmair et al., "PUFs in Security Protocols: Attack Models and Security Evaluations," 2013 *IEEE Symposium on Security and Privacy*, volume 0:286-300, 2013; van Dijk et al., "Physical Unclonable Functions in Cryptographic Protocols: Security Proofs and Impossibility Results," Cryptology ePrint Archive, Report 2012/228, 2012; Wu et al., "On Foundation and Construction of Physical Unclonable Functions," 2010; Yu et al., "Lightweight and Secure PUF Key Storage using Limits of Machine Learning," *Proceedings of the 13th international conference on Cryptographic Hardware and Embedded Systems*, CHES'11, pages 358-373, Springer, 2011).

Prior art PUF-based protocols fall into two broad categories: (1) a simple challenge-response provisioning process like the one described below in Protocol 1, or (2) cryptographic augmentation of a device's PUF response such that the raw PUF output never leaves the device. These approaches may require external entities to handle auxiliary information (e.g., challenges and their associated helper data) that is unsupported or superfluous in existing public key cryptography standards, and/or involve a hardware device authenticating to a challenge applied during an initial enrollment process, and/or are premised on the hardware device always recovering essentially the same response to a given challenge.

While a given challenge-response pair reflects the hardware state of a device when the pair was collected, the device will age and its hardware state drift over time. As the PUF hardware ages, the number of errors present in the responses may increase. Maiti et al. ("The Impact of Aging on an FPGA-Based Physical Unclonable Function," *International Conference on Field Programmable Logic and Applications (FPL)*, pages 151-156, 2011) study the effects of simulated aging on PUF hardware by purposefully stressing the devices beyond normal operating conditions. By varying both temperature and voltage, the authors were able to show a drift in the intra-PUF variation that, over time, will lead to false negatives. Maiti et al. note that the error drift strictly affected the intra-PUF error rate distribution tending towards the maximum entropy rate of 50%. After enough time elapses, the hardware device may no longer be able to recover the proper response for the enrolled challenge.

For example, assume that a specific challenge $c_i$ is issued to a device during enrollment, with the device returning a public token {commitment$_i$, helper$_i$} that links the device's hardware identity with the challenge c. To be authenticated, the device uses the pair {$c_i$, helper$_i$} to recover its private identity $p_i^{priv}$. As shown in FIG. 10, over time the PUF hardware may reach a time (e.g., at time $\tau=5$ in the example of FIG. 10, which for simplicity assumes a drift that occurs linearly over time) at which hardware aging has increased the errors beyond the device's error correction limit, and the device is no longer able to reliably regenerate its private key.

Kirkpatrick et al. ("Software Techniques to Combat Drift in PUF-based Authentication Systems," *Workshop on Secure Component and System Identification*, 2010) describe a method for detecting hardware aging drift, and responding by updating the device's challenge-commitment pair stored on an external server. This approach requires that the server maintain auxiliary information in the form of challenge-commitment pairs, however, and that a periodic protocol be executed between the server and the device.

Another challenge facing PUF-based systems is side channel attacks, which seek to observe and analyze auxiliary environmental variables to deduce information about the sensitive PUF output. For example, electromagnetic (EM) analysis (e.g., Merli et al., "Semi-invasive EM Attack on FPGA RO PUFs and Countermeasures," *Proceedings of the Workshop on Embedded Systems Security*, WESS '11, pages 2:1-2:9, ACM, 2011; Merli et al., "Side-Channel Analysis of PUFs and Fuzzy Extractors," *Trust and Trustworthy Computing*, volume 6740 of *Lecture Notes in Computer Science*, pages 33-47, Springer, 2011; Schuster, *Side-Channel Analysis of Physical Unclonable Functions (PUFs)*, Master's thesis, Technische Universitat Munchen, 2010) extracts PUF output bits by observing changing EM fields during device operation. Another side channel attack methodology is (simple or differential) power analysis (e.g., Karakoyunlu et al., "Differential template attacks on PUF enabled cryptographic devices," *IEEE International Workshop on Information Forensics and Security (WIFS)*, pages 1-6, 2010; Kocher et al., "Introduction to Differential Power Analysis," Cryptography Research, Inc., 2011; Kocher et al., "Differential Power Analysis," *Proceedings of the 19th Annual International Cryptology Conference on Advances in Cryptology*, CRYPTO '99, pages 388-397, Springer, 1999; Rührmair et al., "Power and Timing Side Channels for PUFs and their Efficient Exploitation," 2013), where power traces are collected from a device and analyzed to extract sensitive information (e.g., PUF output bits). Over many observations of a device recovering essentially the same response to a fixed challenge, an adversary can discover the sensitive PUF output.

While it is known that the effectiveness of side channel attacks may in some systems be reduced by introducing randomness (Coron, "Resistance Against Differential Power Analysis For Elliptic Curve Cryptosystems," *Cryptographic Hardware and Embedded Systems*, volume 1717 of *Lecture Notes in Computer Science*, pages 292-302, Springer, 1999), disguising sensitive values in this way may leave some vulnerability since the underlying values remain static and/or introduce additional complexity and/or processing overhead.

SUMMARY OF THE INVENTION

In one embodiment of the invention, a reconfigurable physical unclonable function ('RPUF' or 'reconfigurable PUF') is used with one parameter to recover sensitive values (e.g., a secret or a share of a secret) and a different parameter to encode and store values (e.g., challenge-helper pairs) correlated to the sensitive values. In another embodiment, a pair of RPUFs is used instead of a single RPUF, with one RPUF used to recover sensitive values and the other RPUF used to encode and store correlated values.

In another embodiment, the desired expiration of values can be enforced by employing multiple RPUFs in place of a single PUF. When the device is powered on, one (or more than one, but less than all of) of the RPUFs is selected (preferably randomly) and transitioned from its previous configuration to a new (e.g., random) configuration, invalidating any correlated values (e.g., challenge-helper pairs) previously constructed using the old state of that RPUF. The RPUF that was not reconfigured is then used to recover the sensitive value(s) (e.g., secret or shares thereof) using the remaining correlated value(s) (e.g., challenge-helper pair(s)).

DETAILED DESCRIPTION OF EMBODIMENTS

Figure 1:
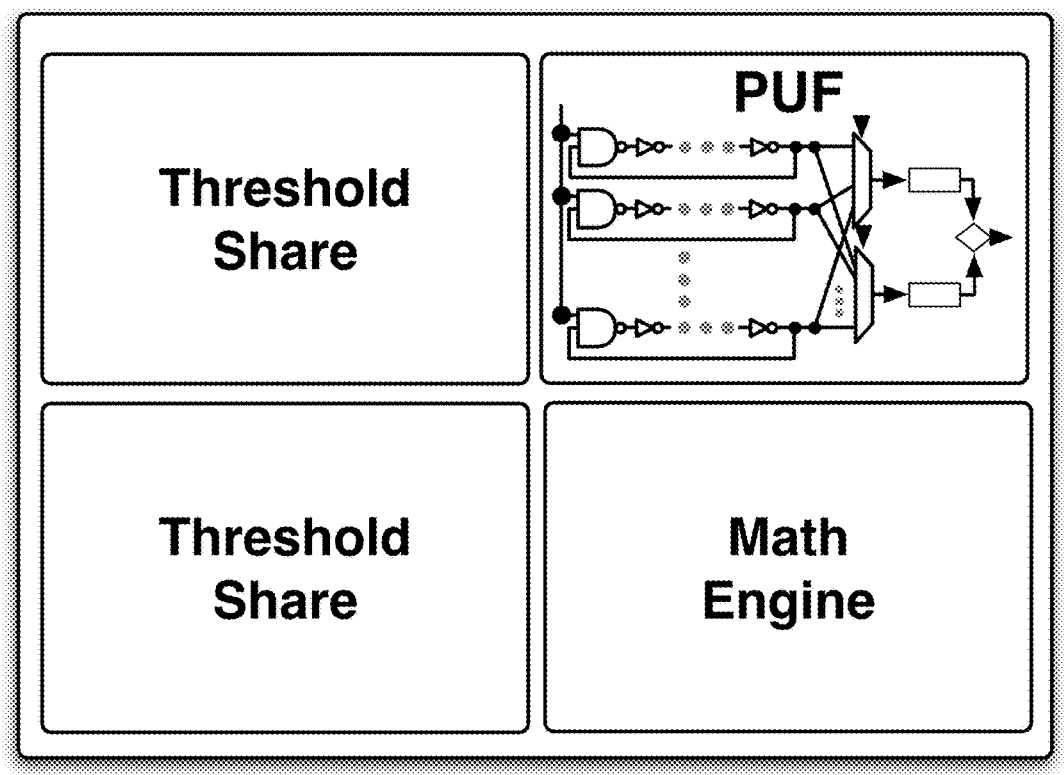
FIG. 1 is a functional diagram of a device having a single PUF circuit and two threshold shares.

The present invention is described with reference to the example of an embodiment utilizing elliptic curve cryptography (including the associated terminology and conventions), but the inventive concept and teachings herein apply equally to various other cryptographic schemes such as ones employing different problems like discrete logarithm or factoring (in which regard the teachings of U.S. Pat. No. 8,918,647 are incorporated here by reference), and the invention is not limited by the various additional features described herein that may be employed with or by virtue of the invention.

Threshold Cryptography

Threshold cryptography involves distributing cryptographic operations among a set of participants such that operations are only possible with the collaboration of a quorum of participants. A trusted dealer $\mathcal{D}$ generates a master asymmetric key pair $\mathcal{P}\ \mathcal{P}^{pub}$, $\mathcal{P}^{priv}\mathcal{P}$ for the set of participants $p_i \in \mathcal{P}$, $|\mathcal{P}|=n$. The private key is then split among the n participants, with each participant receiving a share of $\mathcal{P}^{priv}$. This constitutes a (t, n) sharing of $\mathcal{P}^{priv}$, such that a quorum of at least t participants must combine their private shares in order to perform operations using the master private key.

While other secret schemes can be used with the present invention (e.g., Blakley, "Safeguarding cryptographic keys," *Proceedings of the* 1979 *AFIPS National Computer Conference*, pages 313-317, AFIPS Press, 1979), an example will be described employing Shamir's polynomial interpolation construction ("How to Share a Secret," *Commun. ACM*, volume 22, no. 11:612-613, 1979), which can be used for sharing a secret. A polynomial f(•) of degree t−1 is defined, where the coefficients $c_i$ remain private: $f(x)=c_0+c_1x+\ldots+c_{t-1}x^{t-1}$ mod q. Without knowledge of the coefficients, f(•) can be evaluated when at least t points of f(•) are known by applying Lagrange's polynomial interpolation approach. A private key $\mathcal{P}^{priv}$ can be set as the free coefficient $c_0$ (i.e., $f(0)=\mathcal{P}^{priv}$), and a set of shares of the private key distributed to the participants (cf., e.g., Ertaul, "ECC Based Threshold Cryptography for Secure Data Forwarding and Secure Key Exchange in MANET (I)," *NETWORKING* 2005, *Networking Technologies, Services, and Protocols; Performance of Computer and Communication Networks; Mobile and Wireless Communications Systems*, volume 3462 of *Lecture Notes in Computer Science*, pages 102-113, Springer, 2005). To split the private key $\mathcal{P}^{priv}$ among n participants $p_i \in \mathcal{P}_{1 \leq i \leq n}$, the dealer computes $p_i$'s ⟨public, private⟩ key pair as ⟨$r_i \cdot G$ mod q, $r_i$⟩ such that $r_i=f(i)$, $i\neq 0$. Here, $G \in E/F_p$ is a base point of order q for elliptic curve E, and $(P)_x$ (resp. $(P)_y$) refers to the x (resp. y) coordinate of point P on curve E. (The modulus that operations are performed under may be omitted where it is apparent from context). The public keys are made available to all participants, while the private keys are distributed securely to each participant (e.g., using the device's public key and ElGamal encryption). All participants are also given access to $(c_j \cdot G)_{0 \leq j \leq t-1}$, which allows them to verify their secret key and the public keys of other participants by checking that:

$$r_i \cdot G = \sum_{j=0}^{t-1} i^j(c_j \cdot G) \bmod p$$

This constitutes a (t, n) verifiable secret sharing (VSS) (e.g., Feldman, "A Practical Scheme for Non-interactive Verifiable Secret Sharing," *Proceedings of the* 28*th Annual Symposium on Foundations of Computer Science*, SFCS '87, pages 427-438, IEEE Computer Society, 1987; Pedersen, "Non-Interactive and Information-Theoretic Secure Verifiable Secret Sharing," *Advances in Cryptology, CRYPTO* 91, volume 576 of *Lecture Notes in Computer Science*, pages 129-140, Springer, 1992) of the private key $\mathcal{P}^{priv}$, as participants are able to verify the legitimacy of their share with respect to a globally-known public key.

Now, given access to any t shares $\{(i, r_i)\}_{1 \leq i \leq t}$, where $f(\cdot)$ has degree t−1 and t≤n, the shares $(i, r_i)$ may be combined through Lagrange polynomial interpolation to evaluate f(x):

$$f(x) = \sum_{i=1}^{t} \left( r_i \cdot \left( \prod_{\substack{j=1 \\ j \neq i}}^{t} \frac{x - x_j}{x_i - x_j} \right) \right) \mod q$$

This allows any quorum of t participants $p_i \in \bar{\mathcal{P}} \subseteq \mathcal{P}$ | $\bar{\mathcal{P}}$ |=t≥n to combine their shares $\{(i, r_i)\}_{1 \leq i \leq t}$ and recover the polynomial's free coefficient $c_0$=f(0), which is the master asymmetric private key $\mathcal{P}^{priv}$. Although the Lagrange form is used for the interpolating polynomial, other approaches (e.g., using a monomial basis or the Newton form) may be substituted. Similarly, although the exemplary construction evaluates f(•) rather than recover the coefficients, alternatively the latter may be accomplished using a Vandermonde matrix representation and solving the system of linear equations.

FIG. 3-FIG. 6 illustrate the Lagrange polynomial interpolation of $$P(x) = -\frac{x^3}{6} + \frac{3x^2}{2} - \frac{7x}{3} + 2.$$

Figure 3:
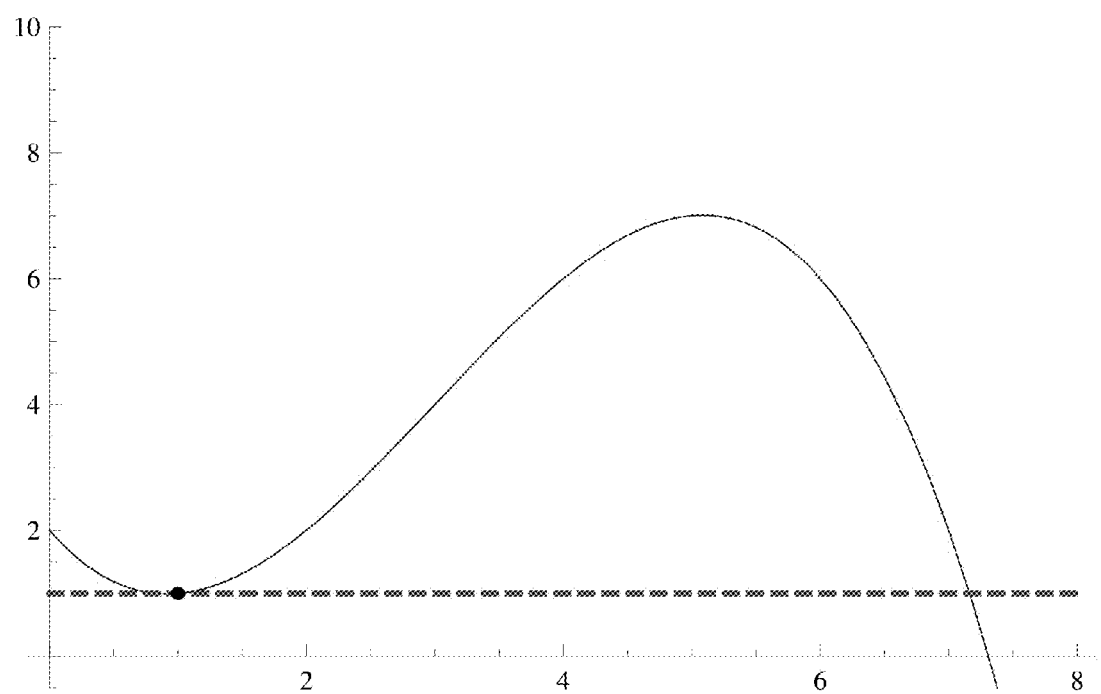
FIG. 3 is a graph illustrating an attempt to interpolate an example polynomial P(x) of degree d=3 given only one point, which fails as at least d+1 points are needed.
Figure 4:
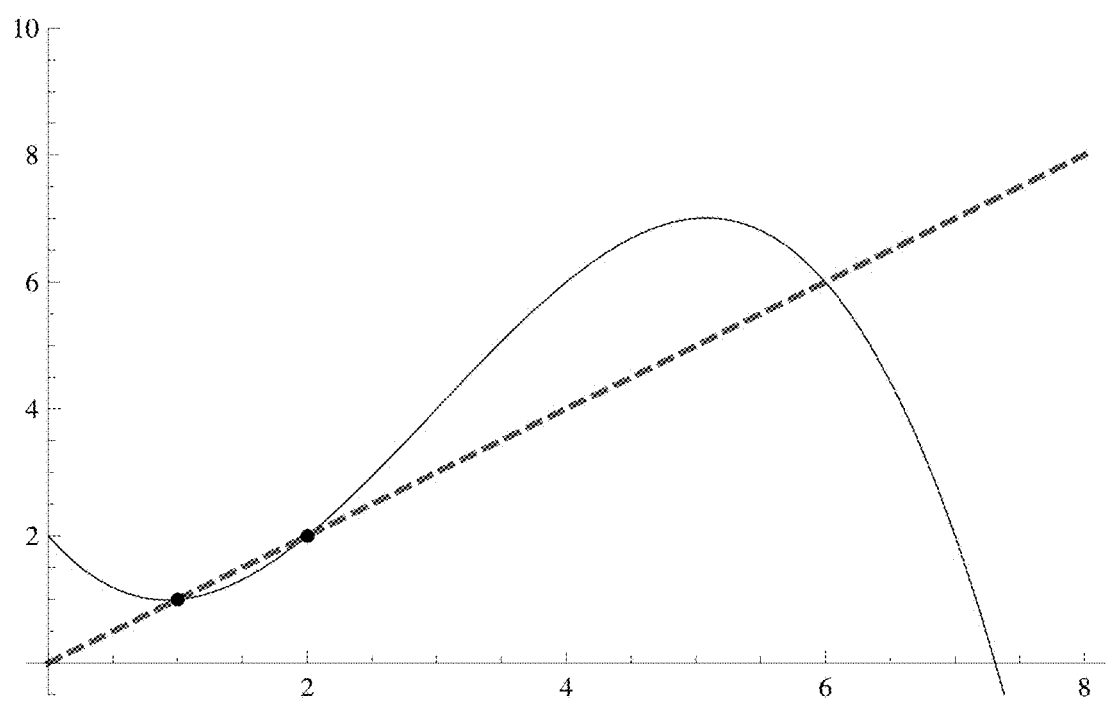
FIG. 4 illustrates a failed attempt to interpolate the same polynomial P(x) given two points.
Figure 5:
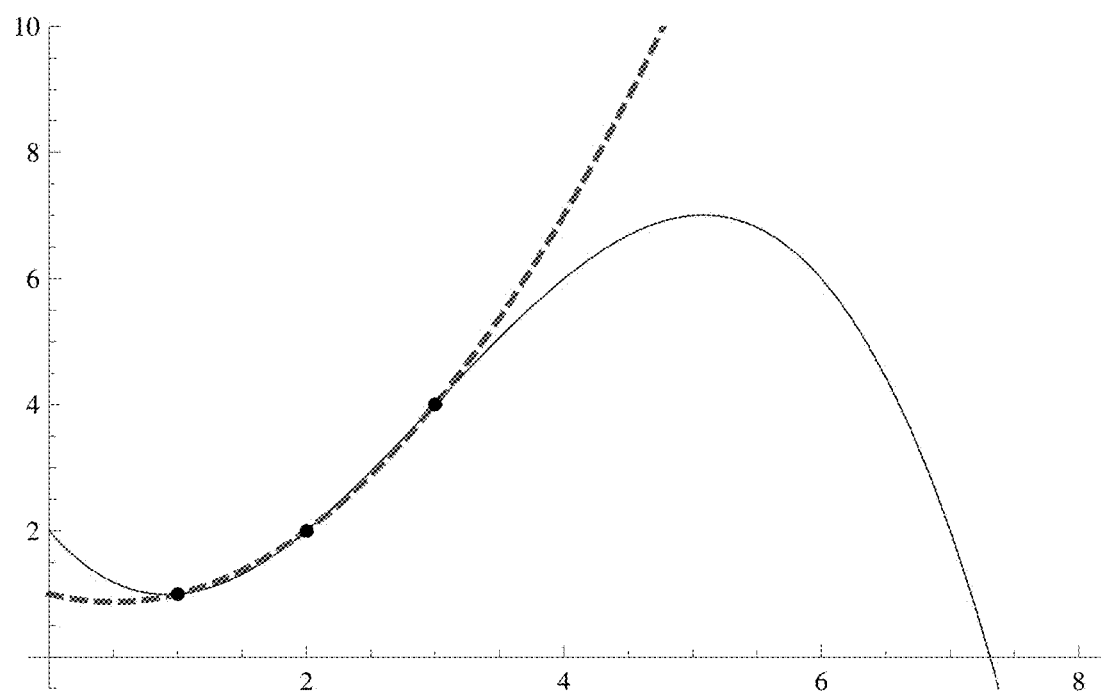
FIG. 5 illustrates a failed attempt to interpolate the same polynomial P(x) given three points.
Figure 6:
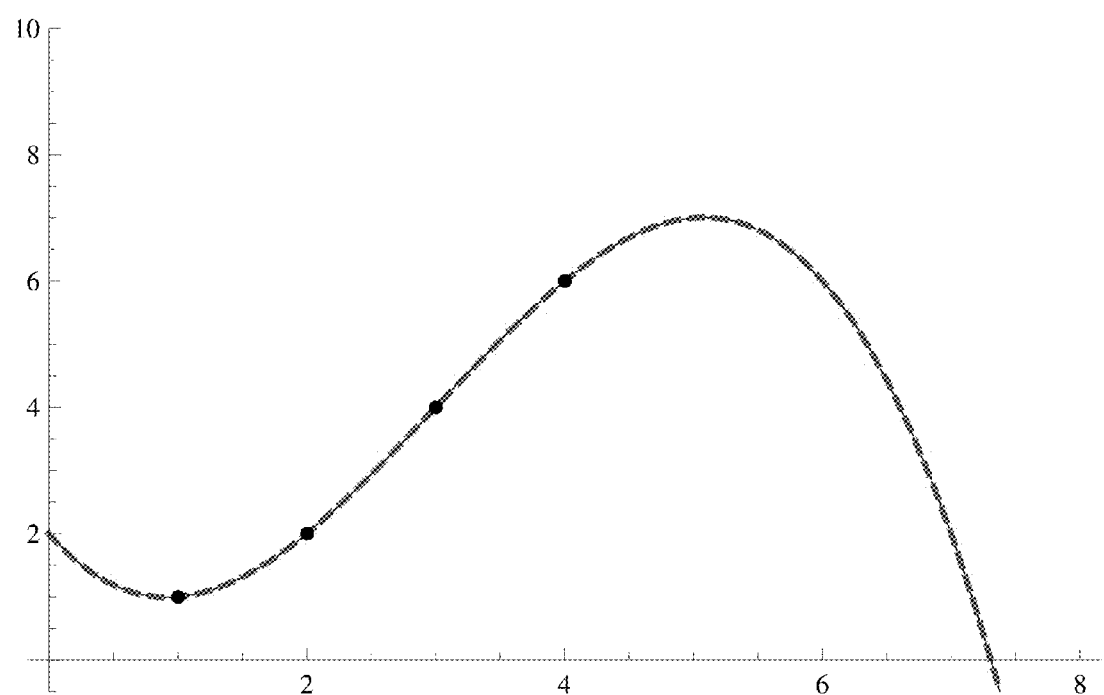
FIG. 6 illustrates a successful interpolation of P(x) given four points.

The interpolating polynomial $\bar{P}(\cdot)$ is generated from a set of k points $\{(x_i, P(x_i))\}_{1 \leq i \leq k}$. FIG. 3 illustrates the interpolating polynomial $\bar{P}(\cdot)$=1, which was generated from only a single point. FIG. 4 illustrates the interpolating polynomial $\bar{P}(\cdot)$=x, which was generated from two points. FIG. 5 illustrates the interpolating polynomial $$\bar{P}(\cdot) = \frac{x^2}{2} - \frac{x}{2} + 1,$$

which was generated from three points. FIG. 6 illustrates the interpolating polynomial $$\bar{P}(\cdot) = \frac{x^3}{6} - \frac{3x^2}{2} - \frac{7x}{3} + 2,$$

which was generated from four points. As the degree of the polynomial is only three, any four points results in a perfect interpolation of the original polynomial. When the size of the set k exceeds the degree of the polynomial t−1 (i.e., k≥t), $\bar{P}(\cdot)$ perfectly interpolates the original polynomial P(•). Thus in this example, the interpolating polynomial is generated from four points, which exceeds the degree (3) of the polynomial. Note that given any set of k<t points, no information about the secret P(0) is revealed, as an infinite number of polynomials of degree t−1 exist that satisfy the set of k<t points.

While an exemplary embodiment may use elliptic curve cryptography, it will be readily apparent that various other cryptographic frameworks (e.g., ElGamal, RSA, NTRU, etc.) could be employed. A number of threshold cryptographic operations can be carried out within this framework, using a variety of methods such as threshold encryption, decryption, and signing, threshold zero knowledge proofs of knowledge, threshold signcryption, and distributed key generation. Other elliptic curve mechanisms such as Massey-Omura, Diffie-Hellman, Menezes-Vanstone, Koyama-Maurer-Okamoto-Vanstone, Ertaul, Demytko, etc. could likewise be employed.

An entity in possession of a device's enrollment information $\{p_i^{pub}, c_i, helper_i\}$ can thus encrypt a message m such that only the target device is able to recover it, using a method such as ElGamal encryption:

---
ElGamal Encryption
---
for Server s do
   Lookup: challenge $c_i$, generator G, modulus p and Helper $h_i$ for Device $p_i$
   Select y $\in \mathbb{F}_p$ uniformly at random
   Lookup public key A = $p_i^{priv} \cdot$ G mod p for Device $p_i$
   Generate shared key: y · G mod p
   Encrypt message m by computing m + (yA)$_y$ mod q
   Device $p_i \leftarrow \{yG, m + (yA)_y \mod q, c_i, G, p, h_i\}$
end for Then, if all participants of a group $\bar{\mathcal{P}} \subseteq \mathcal{P}$, where | $\bar{\mathcal{P}}$ |>t, | $\mathcal{P}$ |=n and t>n, wish to decrypt an encryption (yG, m+ (yrG)$_z$) of a message m∈[1, p−1] using group private key r, threshold ElGamal decryption (e.g., per Ertaul) can be used as follows:

Each participant $p_i \in \bar{\mathcal{P}}$ uses their secret key $r_i$=f(i) to compute a shadow:

$$w_i = \left( \prod_{\substack{j=1 \\ j \neq i}}^{t} \frac{-j}{i - j} \right) \cdot r_i \mod q$$

Each participant then broadcasts their partial decryption $S_i$ defined as $S_i$=$w_i$·yG mod q.
Each participant locally computes the value:

$$S = \sum_{i=j}^{t} S_i \mod q$$
$$= \left( \sum_{i=1}^{t} w_i \right) \cdot yG$$
$$= r \cdot yG$$

Finally, each participant may now locally recover the message m by computing $(m+(yrG)_y)-S \mod q = (m+(yrG)_y)-(ryG)_y = m.$ Likewise, a group $\bar{\mathcal{P}} \subseteq \mathcal{P}$ where | $\bar{\mathcal{P}}$ |≥t, | $\mathcal{P}$ |=n and t<n, can use a threshold signature scheme (e.g., Chen et al., "An efficient threshold group signature scheme," *IEEE Region 10 Conference TENCON*, volume B, pages 13-16 Vol. 2, 2004; Hua-qun et al., "Verifiable (t, n)Threshold Signature Scheme based on Elliptic Curve," *Wuhan University Journal of Natural Sciences*, volume 10, no. 1:165-168, 2005; Ibrahim et al., "A Robust Threshold Elliptic Curve Digital Signature providing a New Verifiable Secret Sharing Scheme," *IEEE 46th Midwest Symposium on Circuits and Systems*, volume 1, pages 276-280 Vol. 1, 2003; Kim et al., "Threshold Signature Schemes for ElGamal Variants," *Computer Standards and Interfaces*, volume 33, no. 4:432-437, 2011; Shao, "Repairing Efficient Threshold Group Signature Scheme," *International Journal of Network Security*, 2008) to generate a signature representing all of $\mathcal{P}$ for message m as follows:

Each participant $p_i \in \bar{\mathcal{P}}$ uses their secret key $r_i$=f(i) and a random integer $y_i \in \mathbb{F}_q$ to calculate their individual signature $(R_i, S_i)$ for message m.

First, $R_i$ is computed from $y_i \cdot G \mod p$ and publicized to all participants $p_i \in \mathcal{P}$.

Next, each participant $p_i$ calculates R, e, and $S_i$ as follows:

$$R = \sum_{i=1}^{t} R_i \mod p$$

$$e = h(m, (R)_y \mod q)$$

$$S_i = y_i + r_i e \left( \prod_{\substack{j=1 \\ j \neq i}}^{t} \frac{-j}{i-j} \right) \mod q$$

h(•) or H(•) denotes a cryptographic hash function. Each participant broadcasts $S_i$ to an appointed secretary (for convenience, and who need not be trusted).

The secretary, having received all $(R_i, S_i)$ pairs, verifies the signature by computing:

$$R = \sum_{i=1}^{t} R_i \mod p$$

$$e = h(m, (R)_y \mod q)$$

$$R_i = S_i \cdot G + e \left( \prod_{\substack{j=1 \\ j \neq i}}^{t} \frac{-j}{i-j} \right) (-p_i^{pub}) \mod p$$

If constructed properly, this equation will hold as:

$$R_i \stackrel{?}{=} S_i \cdot G + e \left( \prod_{\substack{j=1 \\ j \neq i}}^{t} \frac{-j}{i-j} \right) (-p_i^{pub}) \mod p =$$

$$\left( y_i + r_i e \left( \prod_{\substack{j=1 \\ j \neq i}}^{t} \frac{-j}{i-j} \right) \right) \cdot G + e \left( \prod_{\substack{j=1 \\ j \neq i}}^{t} \frac{-j}{i-j} \right) (-r_i G)$$

$$= y_i G + e r_i G \left( \prod_{\substack{j=1 \\ j \neq i}}^{t} \frac{-j}{i-j} \right) + e(-r_i G) \left( \prod_{\substack{j=1 \\ j \neq i}}^{t} \frac{-j}{i-j} \right)$$

$$= y_i G + (e r_i G - e r_i G) \left( \prod_{\substack{j=1 \\ j \neq i}}^{t} \frac{-j}{i-j} \right)$$

$$= y_i G$$

$$:= R_i$$

If these hold, the secretary calculates:

$$S = \sum_{i=1}^{t} S_i \mod q$$

which computes the group signature $((R)_y \mod q, S)$ over m.

Upon receipt of (R, S), receiver $p_R$ checks its validity against the public key $\mathcal{P}^{pub}$ of the entire group of participants $p_i \in \mathcal{P}_{1 \leq i \leq n}$:

$$e \stackrel{?}{=} h(m, (S \cdot G + e \cdot -\mathcal{P}^{pub})_y \mod q)$$

which holds on valid signatures because:

$$e \stackrel{?}{=} h(m, (S \cdot G + e \cdot -\mathcal{P}^{pub})_y \mod q)$$

$$= h(m, ((y + re) \cdot G + e \cdot (-rG))_y)$$

$$= h(m, (yG + erG - erG)_y)$$

$$= h(m, (yG)_y)$$

$$= h(m, (R)_y \mod q)$$

The participants of a group $\bar{\mathcal{P}} \subseteq \mathcal{P}$ where $|\bar{\mathcal{P}}| \geq t$, $|\mathcal{P}| = n$ and $t \leq n$ can also collaborate to demonstrate possession of a shared private key $\mathcal{P}^{priv} = r \in [1, q-1]$ using a threshold Zero Knowledge Proof of Knowledge (e.g., Sardar et al., "Zero Knowledge Proof in Secret Sharing Scheme Using Elliptic Curve Cryptography," *Global Trends in Computing and Communication Systems*, volume 269 of *Communications in Computer and Information Science*, pages 220-226, Springer, 2012) as follows:

The group public key is $\mathcal{P}^{pub} = rG$, where r is a shared secret and G is a group generator. The verifier $\mathcal{V}$ chooses an ephemeral nonce N and distributes this to all participants of $\bar{\mathcal{P}}$.

Each participant $p_i \in \bar{\mathcal{P}}$ uses their secret share $r_i = f(i)$ and a random nonce integer $y_i$ to calculate their individual proof $(B_i, M_i)$ of the shared secret r.

First, $B_1$ is computed and publicized to all participants $p_i \in \bar{\mathcal{P}}$:

$$B_i = y_i \cdot G \mod p$$

Each participant locally computes:

$$B = y \cdot G = \sum_{i=1}^{t} B_i \mod p$$

Next, each participant $p_i$, calculates e, $M_i$ as follows:

$$e = h(G, B, \mathcal{P}^{pub}, N)$$

$$M_i = y_i + r_i e \left( \prod_{\substack{j=1 \\ j \neq i}}^{t} \frac{-j}{i-j} \right) \mod q$$

Upon receipt of $(B_i, M_i)_{1 \leq i \leq t}$, the verifier $\mathcal{V}$ computes:

$$B = \sum_{i=1}^{t} B_i \mod p$$

$$M = \sum_{i=1}^{t} M_i \mod q$$

$$e = h(G, B, \mathcal{P}^{pub}, N)$$

Next, the verifier checks the proofs validity against the public key $\mathcal{P}^{pub} = rG$.

$$B \stackrel{?}{=} M \cdot G - e \cdot \mathcal{P}^{pub} \bmod p$$

$$= (y + re) \cdot G - e \cdot (rG)$$

$$= yG + reG - reG$$

$$= yG$$

If $B = M \cdot G - e \cdot \mathcal{P}^{pub}$, the verifier $\mathcal{V}$ accepts the threshold zero knowledge proof as valid, and rejects the proof otherwise.

The process of signcrypting (e.g., Changgen et al., "Threshold Signcryption Scheme based on Elliptic Curve Cryptosystem and Verifiable Secret Sharing," *International Conference on Wireless Communications, Networking and Mobile Computing*, volume 2, pages 1182-1185, 2005; Zheng, "Digital Signcryption or How to Achieve Cos t(Signature & Encryption)<<Cos t(Signature)+Cos t(Encryption)," *Advances in Cryptology, CRYPTO '97*, volume 1294 of *Lecture Notes in Computer Science*, pages 165-179, Springer, 1997; Zheng et al., "How to Construct Efficient Signcryption Schemes on Elliptic Curves," *Inf. Process. Lett.*, volume 68, no. 5:227-233, 1998) a message facilitates performing both signing and encrypting a message at a cost less than computing each separately. Given a message $m \in [1, q-1]$ and a receiver $p_R$ with public key $p_R^{pub}$, signcryption can be generated as follows:

Each $p_i \in \mathcal{P}$ selects a random $k_i \in [1, q-1]$ and computes $Y_i = k_i \cdot G$ and publicly broadcasts this to both a secretary (for convenience, and who need not be trusted) and the receiver $p_R$. Each $p_i \in \mathcal{P}$ also computes $Z_i = k_i \cdot p_R^{pub}$ which is privately (for example, using ElGamal encryption) sent to $p_R$.

The secretary computes:

$$Z = \sum_{i=1}^{t} Z_i = \sum_{i=1}^{t} k_i \cdot p_R^{pub} = k \cdot p_R^{pub}$$

$$r = m \cdot (Z)_x \bmod p$$

and broadcasts r (not to be confused with $r_i$, participant $p_i$'s share of $\mathcal{P}^{priv}$) to each signer $p_{1 \le i \le t}$.

Each signer $p_{1 \le i \le t}$ computes:

$$x_i = \prod_{\substack{j=1 \\ j \ne i}}^{t} \frac{-j}{i-j} \bmod q$$

$$e_i = r_i \cdot x_i \bmod q$$

$$s_i = k_i - e_i \cdot r \bmod q$$

where $r_i = f(i)$ is $p_i$'s share of $\mathcal{P}^{priv}$. Each signer sends their partial signcryption $s_i$ to the secretary.

Upon receipt of a partial signcryption $s_i$, the secretary computes $Y'_i = r \cdot x_i \cdot p_i^{pub} + s_i \cdot G$ in order to verify the validity of the partial signcryption by checking $Y_i \stackrel{?}{=} Y'_i$.

Once receiving all partial signcryptions $s_i$ and checking their validity, the secretary combines them to compute:

$$s = \sum_{i=1}^{t} s_i \bmod q$$

and (r, s) is the final signcryption sent to receiver $p_R$.

The receiving participant $p_R$, which has now received $\langle \{Y_i = k_i \cdot G\}_{i \in [1 \ldots m]}, (r, s) \rangle$, computes:

$$Y = \sum_{i=1}^{t} Y_i = \sum_{i=1}^{t} (k_i \cdot G) = k \cdot G$$

$$Y' = r \cdot \mathcal{P}^{pub} + s \cdot G$$

$$Z' = p_R^{priv} \cdot Y'$$

The recipient $p_R$ then verifies that:

$$Y' \stackrel{?}{=} r \cdot \mathcal{P}^{pub} + s \cdot G$$

$$= r \cdot \mathcal{P}^{pub} + \sum_{i=1}^{t} s_i \cdot G$$

$$= r \cdot \mathcal{P}^{pub} + G \cdot \sum_{i=1}^{t} (k_i - e_i \cdot r)$$

$$= r \cdot \mathcal{P}^{pub} + \left(G \cdot \sum_{i=1}^{t} k_i\right) - \left(G \cdot \sum_{i=1}^{t} e_i \cdot r\right)$$

$$= r \cdot \mathcal{P}^{pub} + k \cdot G - r \cdot G \cdot \sum_{i=1}^{t} e_i$$

$$= r \cdot \mathcal{P}^{pub} + k \cdot G - r \cdot G \cdot \left(\sum_{i=1}^{t} r_i \cdot \left(\prod_{\substack{j=1 \\ j \ne i}}^{t} \frac{-j}{i-j}\right)\right)$$

$$= r \cdot \mathcal{P}^{pub} + k \cdot G - r \cdot G \cdot (f(0))$$

$$= r \cdot \mathcal{P}^{priv} \cdot G + k \cdot G - r \cdot G \cdot \mathcal{P}^{priv}$$

$$= k \cdot G = Y$$

If these hold, the group signature over m is valid.

The recipient $p_R$ can now recover the message m by computing:

$$r \cdot (Z')_x^{-1} = (m \cdot (Z)_x) \cdot (Z')_x^{-1}$$

$$= (m \cdot (k \cdot p_R^{pub})_x) \cdot (p_R^{priv} \cdot Y')_x^{-1}$$

$$= (m \cdot (k \cdot (p_R^{priv} \cdot G))_x) \cdot (p_R^{priv} \cdot (k \cdot G))_x^{-1}$$

$$= m$$

With this, the recipient $P_R$ has both verified the group's signature over message m, as well as decrypted m.

Distributed Key Generation

Standard threshold cryptographic operations (e.g., those discussed above) traditionally require the presence of a trusted dealer $\mathcal{D}$ to define a generating polynomial $f(\bullet)$, select a secret r, and distribute shares of r to all participants $p_i \in \mathcal{P}$. Distributed key generation protocols (e.g., Ibrahim; Pedersen, "A Threshold Cryptosystem without a Trusted Party," *Advances in Cryptology, EUROCRYPT 91*, volume 547 of *Lecture Notes in Computer Science*, pages 522-526, Springer, 1991; Tang, "ECDKG: A Distributed Key Generation Protocol Based on Elliptic Curve Discrete Logarithm," Technical Report 04-838, Department of Computer Science, University of Southern California, 2004) remove the necessity of a trusted dealer, and allow a set of participants $\mathcal{P}$ to generate shares of a secret where no one knows the shared secret r. This can be accomplished in the present context as follows:

Each participant $p_i \in \mathcal{P}$ defines a random polynomial $f_i(\bullet)$ of degree t−1, where t is the threshold. The temporary private value of participant $p_i$ is $c_0^{(i)}$, the free coefficient of $f_i(\bullet)$.

Each participant $p_i \in \mathcal{P}$ privately sends $f_i(j)$ to participant $p_j$, $\forall j \in [1, \ldots, n]/i$.

Participant $p_i$ broadcasts $\{c_k^{(i)} \cdot G \mod p\}_{k \in [0, \ldots, t-1]}$, commitments to the coefficients of $f_i(\bullet)$.

Participant $p_1$ broadcasts $\{f_i(j) \cdot G \mod p\}_{j \in [0, \ldots, n]}$, the public shares for all participants.

Each participant $p_{j \neq i} \in \mathcal{P}$ must now verify the shares they have received.

First, each participant $p_{j \neq i}$ verifies that:

$$f_i(j) \cdot G \stackrel{?}{=} \sum_{k=0}^{t-1} j^k (c_k^{(i)} \cdot G) \bmod p$$

$$= G \cdot \left( \sum_{k=0}^{t-1} j^k c_k^{(i)} \right)$$

$$= G \cdot f_i(j)$$

Similarly, each participant $p_{j \neq i} \in \mathcal{P}$ verifies that their share is consistent with other shares:

$$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$

$$= G \cdot \sum_{i=1}^{t} \left( \left( \prod_{\substack{j=1 \\ j \neq i}}^{t} \frac{-j}{i-j} \right) f_i(j) \right)$$

$$= G \cdot c_0^{(i)}$$

If these two verifications succeed, each participant $p_i \in \mathcal{P}$ computes its share of the master asymmetric private key r:

$$r_i = \sum_{j=1}^{n} f_j(i) \bmod q$$

Similarly, the master asymmetric public key for the group is computed as:

$$r \cdot G = \sum_{j=1}^{n} \sum_{i=1}^{n} (f_j(i) \cdot G) \bmod p$$

The distributed key generation protocol is preferably secure against an adversary that attempts to bias the output distribution, as in the attack described by Gennaro et al. ("Secure Distributed Key Generation for Discrete-Log Based Cryptosystems," *Advances in Cryptology, EUROCRYPT 99*, volume 1592 of *Lecture Notes in Computer Science*, pages 295-310, Springer, 1999). (Gennaro et al. ("Secure Applications of Pedersen's Distributed Key Generation Protocol," *Topics in Cryptology, CT-RSA 2003*, volume 2612 of *Lecture Notes in Computer Science*, pages 373-390, Springer, 2003) later concluded that many threshold operations may be performed securely despite an adversary's ability to bias the output distribution). Similarly, threshold constructions are preferably secure against both static as well as adaptive malicious adversaries (Abe et al., "Adaptively Secure Feldman VSS and Applications to Universally-Composable Threshold Cryptography," *Advances in Cryptology, CRYPTO 2004*, volume 3152 of *Lecture Notes in Computer Science*, pages 317-334, Springer, 2004; Jarecki et al., "Adaptively Secure Threshold Cryptography: Introducing Concurrency, Removing Erasures," *Advances in Cryptology, EUROCRYPT 2000*, volume 1807 of *Lecture Notes in Computer Science*, pages 221-242, Springer, 2000; Libert et al., "Adaptively Secure Forward-Secure Non-interactive Threshold Cryptosystems," *Information Security and Cryptology*, volume 7537 of *Lecture Notes in Computer Science*, pages 1-21, Springer, 2012).

PUF-Enabled Threshold Cryptography

The core functionality of a PUF is extracting a unique mapping between the challenge (input) domain and the response (output) range. As the mapping from challenges to responses is unique for each PUF-enabled device, collecting a set of challenge-response pairs (CRPs) through a provisioning process allows the device to be verified in the future. Protocol 1 illustrates the naïve provisioning process that underlies many PUF-enabled protocols.

| Protocol 1: Challenge-Response Provisioning | | |
|---|---|---|
| PUF Device D | | Server s |
| | ← | challenge c ∈ $\{0, 1\}^{\kappa_1}$ |
| $P(c) \mapsto r \in \{0, 1\}^{\kappa_2}$ | → | store(D, $\{c, r\}$) |

Authentication proceeds by issuing a challenge for which the response is known to the server, and verifying that the response is t-close to the expected response. However, this lightweight naïve protocol has many limitations. During enrollment, a large number of challenge-response pairs must be collected, as each pair can only be used once for authentication. If an adversary observed the response, it could masquerade as the device. Similarly, the challenge-response database is sensitive, as an adversary could apply machine learning to fully characterize the PUF mapping [Rührmair I]. These issues can be entirely eliminated by applying cryptographic constructs around the PUF functionality.

In the example of an embodiment employing elliptic curve cryptography, Algorithms 1 and 2 below can be used to allow a PUF-enabled device to locally store and retrieve a sensitive value without storing any sensitive information in non-volatile memory. Algorithm 1 illustrates the storing of a sensitive value $\mathcal{V}_i$ using a PUF, and Algorithm 2 illustrates the dynamic regeneration of $\mathcal{V}_i$. The challenge $c_i$ and helper data helper, can be public, as neither reveals anything about the sensitive value $\mathcal{V}_i$. While the present example uses encryption of $\mathcal{V}_i$ by exclusive-or, ⊕, $\mathcal{V}_i$ could also be used as a key to other encryption algorithms (e.g., AES) to enable storage and retrieval of arbitrarily sized values.

| Algorithm 1 PUF-Store |
|---|
| Goal: Store value $\mathcal{V}_i$ |
| for PUF Device d do |

Algorithm 1 PUF-Store

Select finite field $\mathbb{F}_n$ of order n
Select E, an elliptic curve over $\mathbb{F}_n$
Find $G \in E/\mathbb{F}_n$, a group generator
Select challenge $c_i \in \mathbb{F}_n$
$x = H(c_i, E, G, n)$
$O = PUF(x)$
$helper_i = P_i = O \oplus ECC(\mathcal{V}_i)$
Write $\{c_i, helper_i\}$ to non-volatile memory
end for

Algorithm 2 PUF-Retrieve

Goal: Retrieve value $\mathcal{V}_i$
for PUF Device d do
    Read $\{c_i, helper_i\}$ from non-volatile memory
    $x \leftarrow H(c_i, E, G, n)$
    $O' = PUF(x)$
    $\mathcal{V}_i \leftarrow D((ECC(\mathcal{V}_i) \oplus O) \oplus O')$
end for Whenever O and O' are t-close, the error correcting code ECC can be passed to a decoding algorithm D which will recover the sensitive value $\mathcal{V}_i$.

Using Algorithm 3, a local device can perform an enrollment protocol using the PUF. This allows each PUF circuit to generate a local public key $p_i^{pub}$, which is useful for bootstrapping more complex key setup algorithms (e.g., the distributed key generation protocol in Algorithm 4). When the key setup algorithm is performed internal to the device (rather than externally among a set of distinct devices), this bootstrap process may not be necessary.

Algorithm 3 Enrollment for Device d do
    $c_i \in \mathbb{F}_p$, a group element
    $x = H(c_i, E, G, p, q)$
    $O = PUF(x)$
    $helper_i = O \oplus ECC(p_i^{priv} \bmod q)$
    $p_i^{pub} = A_i = p_i^{priv} \cdot G \bmod p$
    Store $\{p_i^{pub}, c_i, helper_i\}$
end for In accordance with the invention, PUF-based cryptographic primitives are adapted to secret sharing to permit threshold cryptography founded on PUF or other root of trust. Using the example of an embodiment employing elliptic curve cryptography, distributed key generation is used to generate a number of shares (for example, two: $r_1$, $r_2$) of a master private key $\mathcal{P}^{priv} = (r_1 + r_2) \bmod q$, which itself is never generated or constructed. (It is also possible to work directly with a message (e.g., as described by Ertaul) rather than a private key). The protocol is summarized in Algorithm 4: PUF-DKG, where an exemplary implementation would choose (t, n) as (2, 2).

Algorithm 4 PUF-DKG

Goal: Generate shares of master private key $\mathcal{P}^{priv}$
for $1 \leq i \leq n$ do
    Select random polynomial $f_i(\cdot) = c_0^{(i)} + \ldots + c_{t-1}^{(i)} x^{t-1} \bmod q$
    Compute $f_i(j), \forall j \in [1, \ldots, n]/i$
    Store coefficient commitments $\{c_k^{(i)} \cdot G \bmod p\}_{k \in [0,\ldots,t-1]}$
    Store share commitments $\{f_i(j) \cdot G \bmod p\}_{j \in [0,\ldots,n]}$
    for $1 \leq i \leq n$ do

Algorithm 4 PUF-DKG

Verify
$$f_i(j) \cdot G \stackrel{?}{=} \sum_{k=0}^{t-1} j^k (c_k^{(i)} \cdot G) \bmod p$$

Verify
$$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$

end for
Recover share
$$r_i = \sum_{j=1}^{n} \left( \left( \prod_{\substack{j=1 \\ j \neq i}}^{t} \frac{-j}{i-j} \right) f_j(i) \right) \bmod q$$

Recover public key
$$\mathcal{P}^{pub} = r \cdot G = \sum_{j=1}^{n} \sum_{i=1}^{n} \left( \left( \left( \prod_{\substack{j=1 \\ j \neq i}}^{t} \frac{-j}{i-j} \right) f_j(i) \right) \cdot G \right) \bmod p$$

end for

Using Algorithms 1 and 2 for storing and retrieving a sensitive value, and Algorithm 4 for performing the initial distributed key generation protocol, arbitrary PUF-enabled threshold cryptographic operations (e.g., decryption, digital signatures, zero knowledge proofs) can now be performed. Algorithm 5 describes how to evaluate an arbitrary threshold cryptographic operation $\mathcal{O}$ that requires as input a participant's share $r_i$. Note that the recovered share $r_i$ has already been multiplied by the Lagrange terms $$\left( \prod_{j=1, j \neq i}^{t} \frac{-j}{i-j} \right).$$

Algorithm 5 PUF-Threshold-OP

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each challenge $c_i$ (Challenge $c = c_0 \| \ldots \| c_n$) do
        Read challenge $c_i$ and helper data $h_i$
        Recover share $r_i \leftarrow$ PUF-Retrieve($c_i, h_i$)
        Perform threshold operation $\mathcal{O}(r_i, \text{Aux})$
    end for
    Combine threshold operations $\mathcal{O} \leftarrow \text{Combine}(\{\mathcal{O}(r_i, \text{Aux})\}_{0 \leq i \leq n})$
    return Result $\mathcal{O}$
end for
for Server s do
    Process operation $\mathcal{O}$
end for This enables any threshold cryptographic operation (e.g., decryption, digital signature generation, zero knowledge proofs) to be performed by a PUF-enabled participant without ever generating, reconstructing, or storing their private key. Further, from an external perspective (e.g., the server), the PUF-enabled device simply implements standard public key cryptographic protocols. That is, the server never issues a challenge or stores helper data, and its interaction with the device is indistinguishable from any standard public key cryptography device.

By internalizing the challenge-response functionality of the PUF, and utilizing Algorithms 1 and 2 to locally store and recover a value (e.g., a cryptographic key), arbitrary (e.g., symmetric or asymmetric) cryptographic operations can be performed without need for issuing or storing auxiliary (e.g., challenges or helper data) information. While one embodiment described herein advantageously strengthens the construction through both distributed key generation and threshold cryptography, neither is necessary to support arbitrary cryptographic operations through localized storage and retrieval of a value using a device's PUF functionality according to the present invention.

Figure 2:
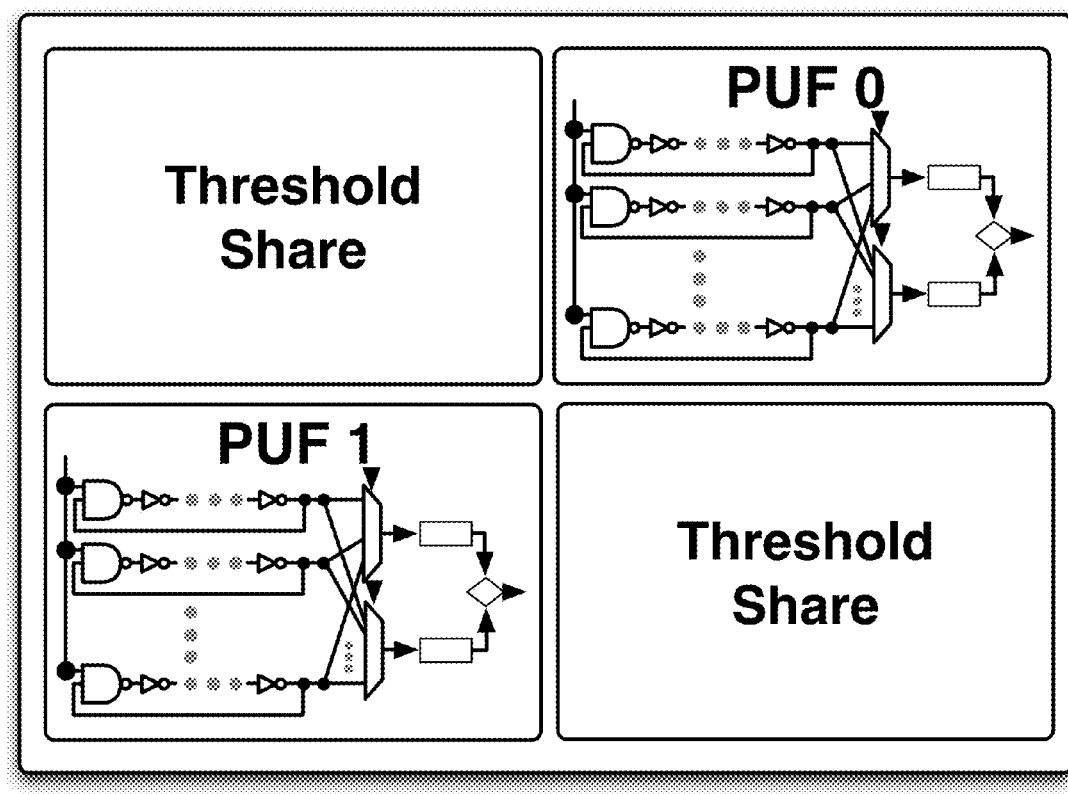
FIG. 2 is a functional diagram of a device having dual PUF circuits.

Although threshold cryptography typically considers distributing operations across physically-distinct nodes, in one embodiment of the present invention, threshold cryptography may be applied within a single device. As an example, a device may be equipped, e.g., with two PUF circuits (e.g., ring oscillator, arbiter, SRAM) and provided with the ability to execute at least two instructions at the same time (e.g., through multiple CPU cores). One embodiment of such a device may comprise a Xilinx Artix 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the device's external input and output and to perform algorithms (sending elliptic curve and other mathematical calculations to the math engine) such as those described above. The FPGA may have one or more PUF circuits implemented in separate areas of the FPGA fabric. Simultaneous execution may be accomplished by instantiating multiple software CPUs, e.g., a MicroBlaze processor. An embodiment of the present invention with only one PUF circuit would simply execute operations over each share sequentially, rather than querying the multiple PUF circuits in parallel. FIG. 2 illustrates a device equipped with two PUF circuits to enable local threshold cryptographic operations; the device may be, for example, an FPGA with a separate core containing each PUF. The potentially extractable output of a single PUF may then be obviated by constructing a local (2, 2) threshold system with each of the parts $p_i$ acting as a distinct participant. For example, each part may select a random challenge, run the enrollment algorithm (Algorithm 3) to generate an asymmetric key pair $\langle p_i^{pub}=p_i^{priv} \cdot G, p_i^{priv} \rangle$ and locally store its public enrollment information and then together run the distributed key generation protocol (Algorithm 4) and perform all cryptographic operations over a private key that is never actually constructed. When threshold cryptography is applied within a single device, it may not be necessary to run the enrollment algorithm (Algorithm 3) to generate an asymmetric key pair as all computations are performed internal to the device.

Algorithm 6 describes how a dual-PUF device can compute cryptographic operations in a threshold manner by constructing a (2, 2) threshold sharing within the device using distributed key generation. That is, the two parts establish a private key known to neither part through distributed key generation and publicize the corresponding public key $\mathcal{P}^{pub}$. All operations targeted at the device are now performed in a threshold manner through internal collaboration (with each part retrieving its share $r_i$ and performing a local threshold operation, and the results are combined to complete a threshold operation $\mathcal{O}$), while the input/output behavior of the device remains unchanged to external systems.

---

Algorithm 6 Dual-PUF-Threshold-OP

Goal: Perform threshold operation $\mathcal{O}$ at time $\tau$
One-Time Setup Stage for each PUF Core $p_i \in \mathcal{P}$ do
    Run Algorithm 3: Enrollment, Publicize $p_i^{pub}$
end for
Run (2, 2)-PUF-DKG, Publicize $\mathcal{P}^{pub}$
Evaluation Stage for each PUF Core $p_i \in \mathcal{P}$ do
    Recover share $r_i^{(\tau)} \leftarrow$ PUF-Retrieve($c_i^{(\tau)}$, helper$_i^{(\tau)}$)
    $p_i^{(\mathcal{O})} \leftarrow \mathcal{O}(r_i^{(\tau)})$, PUF core local threshold share
end for
return $\mathcal{O} \leftarrow$ Combine($\{p_0^{(\mathcal{O})}, p_1^{(\mathcal{O})}\}$)

---

Thus, rather than being constrained to a mapping between a challenge issued to the device and its response (which to an extent may be a function of the challenge), a multi-PUF device $d_i$ can have a single static external identity, $p_i^{pub}$. The challenge-response functionality of each PUF core is used to maintain each share of the device's private identity, $p_i^{priv}$, which is never generated or constructed. This renders a side channel attack more difficult for a remote adversary, which now must observe and resolve multiple values simultaneously generated within the device. Each part retrieves its share $r_i^{(\tau)}$ and performs a local threshold operation, and the shares are combined to complete the operation $\mathcal{O}$.

Figure 7:
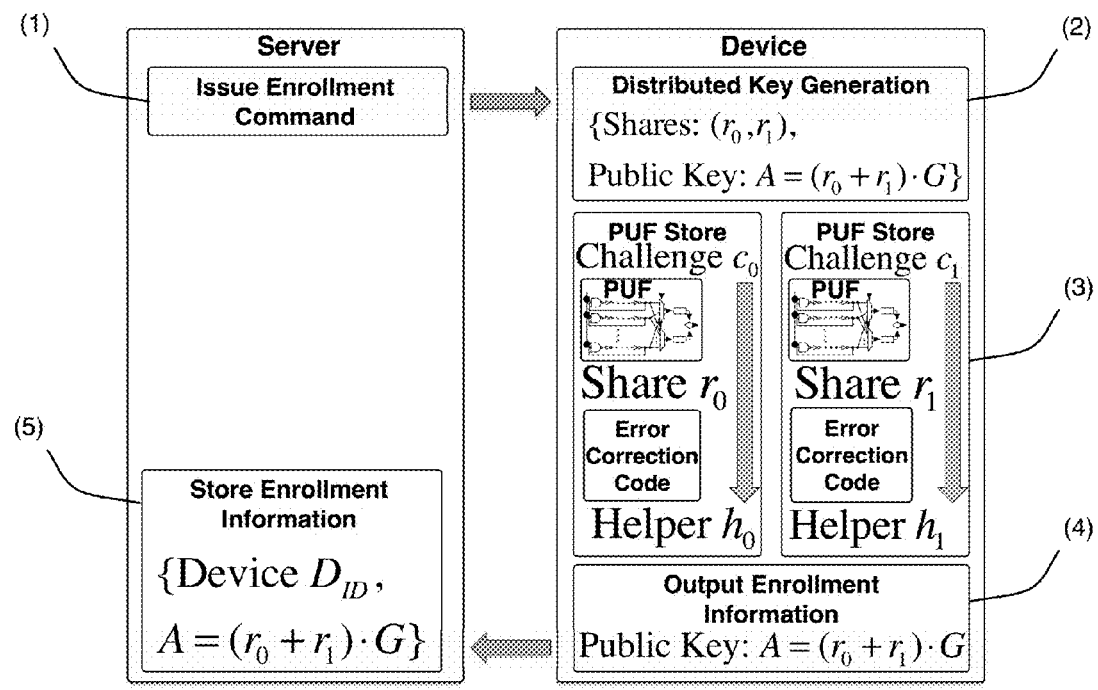
FIG. 7 is an operational flowchart of enrollment of a device like that of FIG. 2 in an embodiment of the invention.
Figure 8:
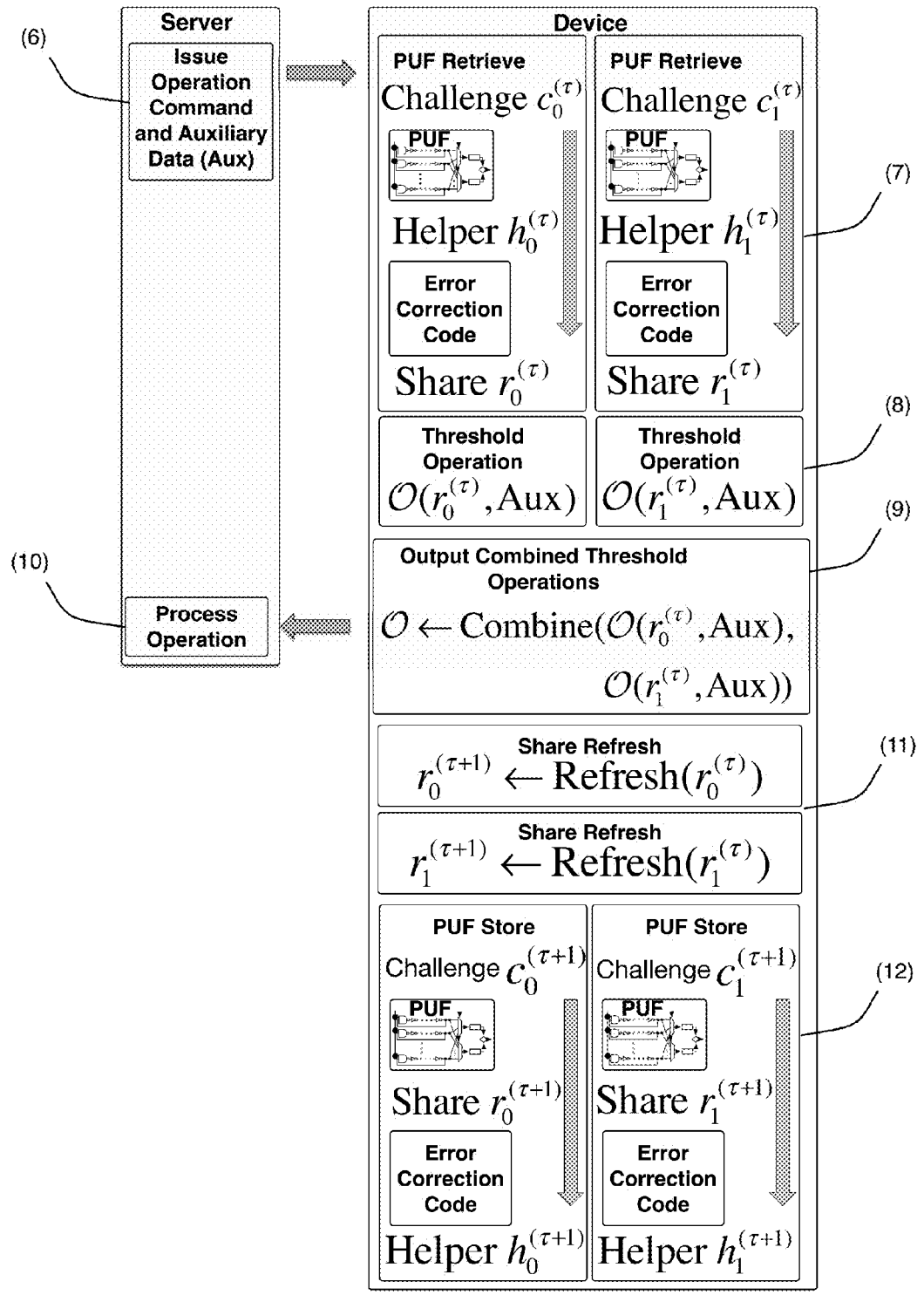
FIG. 8 is an operational flowchart of threshold cryptographic operations in a device like that of FIG. 2 in an embodiment of the invention.

Referring to FIG. 7 and FIG. 8, the core operations of an example embodiment employing elliptic curve cryptography, division of a key into two shares, and a (2, 2) threshold operation, are described.

Enrollment Command 1: During the initial enrollment process, the server and device agree on an elliptic curve E defined over a finite field $\mathbf{F}_p$ and base point G of order q, where p is $\lambda$ bits long. The server issues the enrollment command to the device.

Distributed Key Generation 2: The device performs a distributed key generation locally, creating shares ($r_0$, $r_1$) of the master private key (which is never generated or constructed) and its public key $A=(r_0+r_1) \cdot G$. Rather than directly add the shares together (which would construct the private key $r=r_0+r_1$), the public key is formed by computing $(r_0 \cdot G)+(r_1 \cdot G)$.

Helper Data Generation 3: The device generates a random challenge $c=c_0 \| c_1$, where $\|$ denotes concatenation and each $c_i$ block is $\lambda$ bits long. The device links each share $r_i$ to the output $O_i$ of the PUF on challenge $c_i$ through fuzzy extraction, which outputs a public helper $h_i$. As the PUF output $O_i$ is noisy, there is no guarantee that when queried on challenge $c_i$ in the future, the new output $O'_i$ will satisfy $O'_i = O_i$. However, it is assumed that $O_i$ and $O'_i$ will be t-close with respect to some distance metric (e.g. Hamming distance). Thus, an error correcting code may be applied to the PUF output such that at most t errors will still recover $O_i$. Error correction may be applied over each share $r_i$, and this value blinded with the output of the PUF $O_i$ on challenge $c_i$, so that each helper value $h_i = ECC(r_i) \oplus O_i$ reveals no information about share $r_i$. During recovery through fuzzy extraction, computing the exclusive-or of ECC$(r_i) \oplus O_i \oplus O'_i$ will return $r_i$ whenever $O_i$ and $O'_i$ are t-close. The device locally stores the challenge $c=c_0 \| c_1$ and helper data $h=h_0\|h_1$, which will allow it to later recover the shares. Note that both the challenge and the helper data are public, and reveal nothing about the shares or the device's private key without invoking the PUF. This process is described by Algorithm 1.

Returned Public Key 4: The device returns its public enrollment information $\{A=(r_0+r_1)\cdot G\}$ to the server.

Store Enrollment 5: The server stores the device's public enrollment information along with a (non-sensitive) identifier that is unique to the device (e.g., a serial number).

Threshold Operation Query 6: When the server wishes the device to perform a cryptographic operation (e.g., decryption, digital signature generation, zero knowledge proof authentication), it issues:
  the appropriate command for the operation to be performed
  any auxiliary data Aux that is necessary for the operation (e.g., ciphertext to be decrypted, a message to be signed)

PUF Retrieval 7: The device reads the challenge $c=c_0\|_1$ and helper data $h=h_0\|h_1$ from its local storage. The device then queries the PUF on each challenge block $c_i$, and combines the output $O'_i$ with the helper block $h_i$ and error correcting code to recover each share block $r_i$. This process is described by Algorithm 2.

Threshold Operation 8: The device performs a threshold operation $\mathcal{O}(r_i, \text{Aux})$ over each share $r_i$. Algorithm 5 describes this process for any arbitrary threshold operation $\mathcal{O}$.

Combined Threshold Operations 9: The device combines the threshold operations to form the complete operation $\mathcal{O}$ and returns the result to the server.

Process Operation 10: The server finally performs any additional processing required for the operation (e.g., verifying a zero knowledge proof).

Share Refreshing

Various share refresh protocols (e.g., Frankel et al., "Optimal-Resilience Proactive Public-Key Cryptosystems," 38*th Annual Symposium on Foundations of Computer Science*, pages 384-393, 1997; Herzberg et al., "Proactive Public Key and Signature Systems," *Proceedings of the 4th ACM Conference on Computer and Communications Security*, CCS '97, pages 100-110, ACM, 1997; Herzberg et al., "Proactive Secret Sharing Or: How to Cope With Perpetual Leakage," *Advances in Cryptology, CRYPTO 95*, volume 963 of *Lecture Notes in Computer Science*, pages 339-352, Springer, 1995) allow each of a set of players $p_i \in \mathcal{P}$ to refresh their share $r_i^{(\tau)}$ of an original secret $r$ at time period $\tau$ into a new share $r_i^{(\tau+1)}$ such that the resulting set of new shares $\{r_i^{(\tau+1)}\}_{i \in [1\ldots n]}$ remains a sharing of the original secret. This protocol does not require reconstruction of the master secret $r$, so a mobile adversary would have to compromise $t$ players in a fixed time period $\tau$ in order to recover the shared secret. Assuming a polynomial $f(\bullet)$ of degree $(t-1)$ represents a shared secret $r=f(0)$ amongst $n$ participants each having a share $r_i=f(i)$, and denoting encrypting for player $p_j$ as $ENC_j(\bullet)$ and decryption by $p_j$ as $DEC_j(\bullet)$, the set of players $p_i \in \mathcal{P}$ can refresh their sharing of $r$ using such a protocol as follows:

Each player $p_i$ defines a new polynomial of degree $(t-1)$ such that $\delta_i(0)=0$:

$$\delta_i(\bullet)=\Delta_1^{(i)}x+\ldots+\Delta_m^{(i)}x^{t-1}$$

where the set $\{\Delta_m^{(i)}\}_{m \in [1\ldots t-1]}$ is chosen randomly from $\mathbb{Z}_q$.

Each player $p_i$ computes the following sets:

$$\{\epsilon_{im}=\Delta_m^{(i)}\cdot G\}_{m\in[1\ldots t-1]}$$

$$\{u_{ij}=\delta_i(j)\}_{j\in[1\ldots n]}$$

$$\{e_{ij}=ENC_j(u_{ij})\}_{j\in[1\ldots n]}$$

and broadcasts a verifiable secret sharing $VSS_i^{(\tau)}=\langle i, \tau, \{\epsilon_{im}\}, \{e_{ij}\}\rangle$ and their signature $SIG_i(VSS_i^{(\tau)})$.

Each player $p_i$ recovers $u_{ji}=DEC_i(ENC_i(u_{ji}))$ and verifies $\forall j\neq i$:

$$u_{ji}\cdot G \stackrel{?}{=} \sum_{k=1}^{t-1} i^k \epsilon_{jk}$$

$$= \sum_{k=1}^{t-1}(i^k\Delta_k^{(j)}\cdot G)$$

$$= G\cdot \sum_{k=1}^{t-1} i^k \Delta_k^{(j)}$$

$$= G\cdot \delta_j(i) = G\cdot u_{ji}$$

Finally, each player $p_i$ updates their share from time period $(\tau)$ as:

$$r_i^{(\tau+1)} \leftarrow r_i^{(\tau)} + \left(\sum_{j=1}^{n} u_{ji} \bmod q\right)$$

Thus, the refreshed set of shares $\{r_i^{(\tau+1)}\}_{i\in[1\ldots n]}$ remains a sharing of the master private key $\mathcal{P}^{priv}$, and yet knowledge of $t-1$ or fewer shares from time period $\tau$ is useless in time period $\tau+1$.

As outlined in Algorithm 7, participants can update their share $r_i^{(\tau)}$ in time period $\tau$ to a new share $r_i^{(\tau+1)}$ in the next time period such that the set of shares $\{r_i\}_{i\in[1\ldots n]}$ remains a sharing of the master private key $\mathcal{P}^{priv}$.

---

Algorithm 7 PUF-Share-Update

Goal: Generate new share $r_i^{(r+1)}$
for all Participants $p_i \in \mathcal{P}$ do
  Recover share $r_i^{(r)}$
    $r_i^{(r)} \leftarrow$ PUF-Retrieve($c_i^{(r)}$, helper$_i^{(r)}$)
Select random polynomial of degree $(t-1)$ such that $\delta_i(0) = 0$:
    $\delta_i(\cdot) = \Delta_1^{(i)}x + \ldots + \Delta_m^{(i)}x^{t-1}$
Compute
    $\{\epsilon_{im} = \Delta_m^{(i)}\cdot G\}_{m\in[1\ldots t-1]}$
    $\{u_{ij} = \delta_i(j)\}_{j\in[1\ldots n]}$
    $\{e_{ij} = ENC_j(u_{ij})\}_{j\in[1\ldots n]}$
Broadcast
    $VSS_i^{(r)} = \langle i, r, \{\epsilon_{im}\}, \{e_{ij}\}\rangle$,
    $SIG_i(VSS_i^{(r)})$
Verify $\forall j \neq i$
    $DEC_i(ENC_i(u_{ji}))\cdot G \stackrel{?}{=} \sum_{k=1}^{t} i^k \epsilon_{jk}$
Update share as:
    $r_i^{(r+1)} \leftarrow r_i^{(r)} + \left(\sum_{j=1}^{n} u_{ji}\bmod q\right)$
Store $r_i^{(r+1)}$ and update PUF challenge:
    $\{c_i^{(r+1)}, \text{helper}_i^{(r+1)}\} \leftarrow$ PUF-Store($r_i^{(r+1)}$)
end for

---

The hardware device performs Algorithm 7 at Share Refresh 11 in FIG. 8 to generate new shares $r_i^{(\tau+1)}$ for the next time period τ+1. At PUF Refresh and Store 12, the hardware device generates a new challenge $c_i^{(\tau+1)}$, which will refresh the challenge-helper pair for the next time period. The hardware device uses the new challenge to store the updated share $r_i^{(\tau+1)}$. Algorithms 5 and 6 are modified to refresh both the threshold shares as well as the challenge-helper pair, with Algorithms 8 and 9, respectively, reflecting the modifications.

---
Algorithm 8 PUF-Threshold-OP-Refreshing
---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each challenge $c_i$ (Challenge $c = c_0 \| \ldots \| c_n$) do
        Read challenge $c_i$ and helper data $h_i$
        Recover share $r_i \leftarrow$ PUF-Retrieve$(c_i, h_i)$
        Perform threshold operation $\mathcal{O}(r_i, \text{Aux})$
    end for
    Combine threshold operations $\mathcal{O} \leftarrow$ Combine$(\{\mathcal{O}(r_i, \text{Aux})\}_{0 \leq i \leq n})$
    return Result $\mathcal{O}$
    for each share $r_i$ do
        Update share
            $r_i^{(\tau+1)} \leftarrow$ PUF-Share-Update$(r_i^{(\tau)})$
        Store $r_i^{(\tau+1)}$ and update PUF challenge:
            $\{c_i^{(\tau+1)}, \text{helper}_i^{(\tau+1)}\} \leftarrow$ PUF-Store$(r_i^{(\tau+1)})$
    end for
end for
for Server s do
    Process operation $\mathcal{O}$
end for ---
Algorithm 9 Dual-PUF-Threshold-OP-Refreshing
---

Goal: Perform threshold operation $\mathcal{O}$ at time $\tau$
One-Time Setup Stage for each PUF Core $p_i \in \mathcal{P}$ do
    Run Algorithm 3: Enrollment, Publicize $p_i^{pub}$
end for
Run (2, 2)-PUF-DKG Protocol, Publicize $\mathcal{P}^{pub}$
Evaluation Stage for each PUF Core $p_i \in \mathcal{P}$ do
    Recover share $r_i^{(\tau)} \leftarrow$ PUF-Retrieve$(c_i^{(\tau)}, \text{helper}_i^{(\tau)})$
    $p_i^{(\mathcal{O})} \leftarrow \mathcal{O}(r_i^{(\tau)})$, PUF core local threshold share
    Update share
        $r_i^{(\tau+1)} \leftarrow$ PUF-Share-Update$(r_i^{(\tau)})$
    Store $r_i^{(\tau+1)}$ and update PUF challenge:
        $\{c_i^{(\tau+1)}, \text{helper}_i^{(\tau+1)}\} \leftarrow$ PUF-Store$(r_i^{(\tau+1)})$
end for
return $\mathcal{O} \leftarrow$ Combine$(\{p_0^{(\mathcal{O})}, p_1^{(\mathcal{O})}\})$ Referring for example to a single-PUF embodiment as shown in FIG. 1, share updating may optionally be logically split into a preparation phase (Algorithm 10) and an application phase (Algorithm 11). During preparation, each participant generates its random polynomial and distributes its portion of the update to the other participants. After all participants have broadcast their portions of the share update, the preparation phase is complete. (Broadcasting may be omitted if preparation is applied within a single device such as an FPGA).

---
Algorithm 10 PUF-Share-Update-Preparation
---

Goal: Prepare update to construct share $r_i^{(\tau+1)}$
for all Participants $p_i \in \mathcal{P}$ do ---
Algorithm 10 PUF-Share-Update-Preparation
---

Select random polynomial of degree $(t - 1)$ such that $\delta_i(0) = 0$:
    $\delta_i(\cdot) = \Delta_1^{(i)} x + \ldots + \Delta_m^{(i)} x^{t-1}$
Compute
    $\{\epsilon_{im} = \Delta_m^{(i)} \cdot G\}_{m \in [1 \ldots t-1]}$
    $\{u_{ij} = \delta_i(j)\}_{j \in [1 \ldots n]}$
    $\{e_{ij} = \text{ENC}_j(u_{ij})\}_{j \in [1 \ldots n]}$
Broadcast
    $\text{VSS}_i^{(\tau)} = \langle i, \tau, \{\epsilon_{im}\}, \{e_{ij}\}\rangle$,
    $\text{SIG}_i(\text{VSS}_i^{(\tau)})$
end for Next, each participant verifies the update information received from other participants and applies the update to its share as set forth in Algorithm 11.

---
Algorithm 11 PUF-Share-Update-Application
---

Goal: Apply share update to construct $r_i^{(\tau+1)}$
for all Participants $p_i \in \mathcal{P}$ do
    Recover share $r_i^{(\tau)}$
        $r_i^{(\tau)} \leftarrow$ PUF-Retrieve$(c_i^{(\tau)}, \text{helper}_i^{(\tau)})$
    Verify $\forall j \neq i$ $$\text{DEC}_i(\text{ENC}_i(u_{ji})) \cdot G \stackrel{?}{=} \sum_{k=1}^{t} i^k \in j_k$$

Update share as:

$$r_i^{(\tau+1)} \leftarrow r_i^{(\tau)} + \left(\sum_{j=1}^{n} u_{ji} \bmod q\right)$$

end for

As each threshold operation over a share can be performed independently of the other shares, the device need only recover one share at a time. This process is illustrated in Algorithm 12. Upon receiving a command $\mathcal{O}$ and its associated auxiliary information Aux, the device first performs Algorithm 10 to prepare for the share update. Next, the device iteratively performs threshold operations over each share. A share is recovered by reading a challenge-helper pair from non-volatile memory, and using the PUF to regenerate the corresponding share. After performing a threshold operation over the share, the share update is applied using Algorithm 11, which generates the updated share for new time period (τ+1). After computing the threshold operations over each share, the threshold operations are combined to form the result $\mathcal{O}$ which is returned to the server.

---
Algorithm 12 PUF-Threshold-OP-Staggered
---

Goal: Perform threshold operation $\mathcal{O}$
Assume: PUF-DKG (Algorithm 4) has been executed by PUF Device d
for Server s do
    Issue Command $\mathcal{O}$ and Auxiliary Information Aux
end for
for PUF Device d do
    for each share $r_i$ do
        PUF-Share-Update-Preparation
    end for
    for each challenge $c_i$ (Challenge $c = c_0 \| \ldots \| c_n$) do
        Read challenge $c_i$ and helper data $h_i$
        Recover share $r_i \leftarrow$ PUF-Retrieve$(c_i, h_i)$
        Perform threshold operation $\mathcal{O}(r_i, \text{Aux})$
        Update share
            $r_i^{(\tau+1)} \leftarrow$ PUF-Share-Update-Application$(r_i^{(\tau)})$
        Store $r_i^{(\tau+1)}$ and update PUF challenge:
            $\{c_i^{(\tau+1)}, \text{helper}_i^{(\tau+1)}\} \leftarrow$ PUF-Store$(r_i^{(\tau+1)})$
    end for Algorithm 12 PUF-Threshold-OP-Staggered Combine threshold operations $\mathcal{O} \leftarrow$ Combine($\{\mathcal{O}(r_i, \text{Aux})\}_{0 \leq i \leq n}$)
return Result $\mathcal{O}$
end for
for Server s do
   Process operation $\mathcal{O}$
end for In one embodiment, a (2, 2) threshold system is constructed internally to the device. Algorithm 13 illustrates an example of a single-PUF (2, 2) threshold construction of the more general Algorithm 12. The device has the share set $\{r_0, r_1\}$, and iteratively computes a threshold operation over each share to produce the set $\{p_0^{(\mathcal{O})}, p_1^{(\mathcal{O})}\}$. Once both threshold operations are complete and the shares have been updated and stored, the two threshold operations are combined into the final output $\mathcal{O}$.

Algorithm 13 Internal-PUF-Threshold-OP-Staggered

Goal: Perform threshold operation $\mathcal{O}$ at time $\tau$
One-Time Setup Stage for each Threshold Share $r_i$ do
   Run Algorithm 3: Enrollment, Publicize $p_i^{pub}$
end for
Run (2, 2)-PUF-DKG Protocol, Publicize $\mathcal{P}^{pub}$
Evaluation Stage for each Threshold Share $r_i$ do
   PUF-Share-Update-Preparation
end for
for each Threshold Share $r_i$ do
   Recover share $r_i^{(\tau)} \leftarrow$ PUF-Retrieve($c_i^{(\tau)}$, helper$_i^{(\tau)}$)
   $p_i^{(\mathcal{O})} \leftarrow \mathcal{O}(r_i^{(\tau)})$, Local threshold operation
   Update share
      $r_i^{(\tau+1)} \leftarrow$ PUF-Share-Update-Application($r_i^{(\tau)}$)
   Store $r_i^{(\tau+1)}$ and update PUF challenge:
      $\{c_i^{(\tau+1)}, \text{helper}_i^{(\tau+1)}\} \leftarrow$ PUF-Store($r_i^{(\tau+1)}$)
end for
return $\mathcal{O} \leftarrow$ Combine($\{p_0^{(\mathcal{O})}, p_1^{(\mathcal{O})}\}$)

Figure 9:
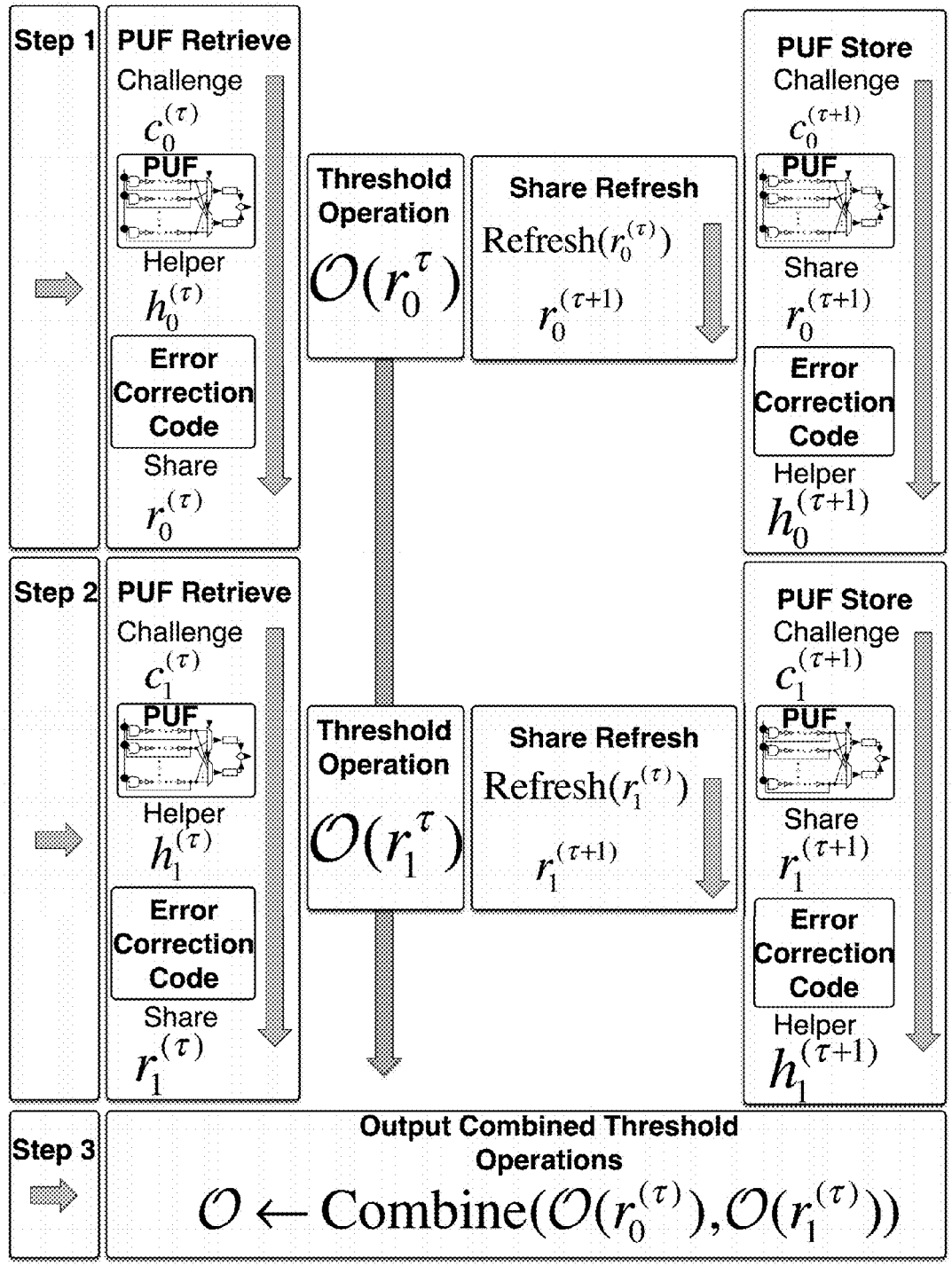
FIG. 9 is an operational flowchart of the staggered threshold cryptographic operations in a device like that of FIG. 1 in an embodiment of the invention.
Figure 10:
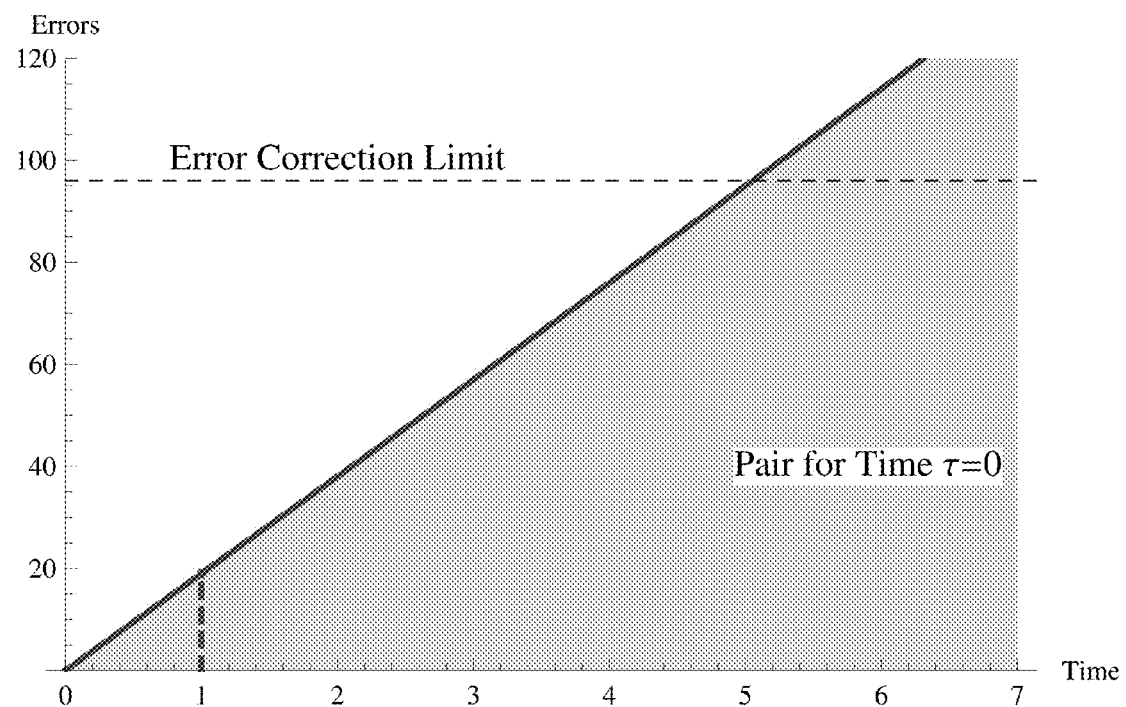
FIG. 10 is a graph illustrating errors over time in PUF output for a fixed challenge.

The flow of Algorithm 13, a specific single-PUF (2, 2) threshold construction of the more general Algorithm 12, is illustrated in FIG. 9. Prior to Step 1, the share update preparation (Algorithm 10) is performed. In Step 1, the first share $r_0^{\tau}$ is retrieved and its corresponding local threshold operation is performed. The share update (Algorithm 11) is then applied to $r_0^{\tau}$ to yield $r_0^{(\tau+1)}$ for the next time period. The updated share is then stored using a new random challenge $c_0^{(\tau+1)}$ which generates the corresponding helper data $h_0^{(\tau+1)}$ which will allow the updated share to be recovered using the PUF. The same process is followed in Step 2 for share $r_1^{\tau}$. Finally, the combined output $\mathcal{O}$ is constructed by combining the two local threshold operations that were performed over each share.

The device has a constant identity $(\mathcal{P}^{pub}, \mathcal{P}^{priv})$, yet all operations $\mathcal{O}$ that require $\mathcal{P}^{priv}$ are performed without ever reconstructing $\mathcal{P}^{priv}$ and with values that change after each operation is executed. As each part uses the PUF-Store and PUF-Retrieve algorithms to maintain its share, the (challenge, helper) pair is updated after each operation when PUF-Store is executed. Each share is refreshed for the new time period $\tau+1$, and is stored by generating a new random challenge $c_i^{(\tau+1)}$ and setting the updated helper to helper$_i^{(\tau+1)} \leftarrow$ ECC($r_i^{(\tau+1)}$)$\oplus$PUF($c_i^{(\tau-1)}$). Staggering the threshold operations such that the share regeneration, threshold operation, and share storing occur consecutively (rather than concurrently), precludes the simultaneous recovery of more than one updated share. Any tampering while one share exists would (assuming tampering pushes PUF output beyond error correction limits) prevent recovery of another share, in which case the device cannot perform operations over its private key.

An adversary applying a side channel attack against such an embodiment therefore must extract t or more shares from a period of observation that cannot exceed the period of refreshment. In other words, the adversary must compromise t devices in a given time period $\tau$ since any shares from time period $\tau$ are useless in time period $\tau+1$. The difficulty of a side channel attack thus can be increased by updating more frequently (even after each operation). (Increasing refresh frequency also may multiply the difficulty inherent in side channel attacks on multiple-PUF device embodiments that are not staggered, wherein a remote adversary must observe and resolve multiple PUF values simultaneously generated in the device).

Figure 11:
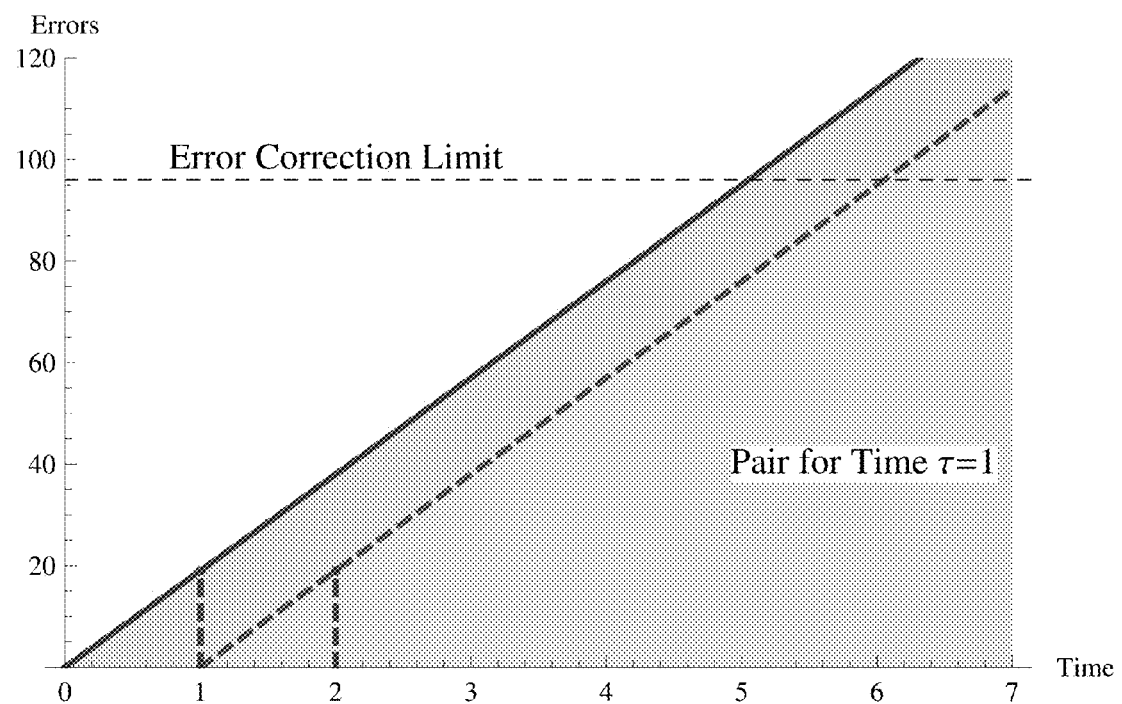
FIG. 11 is a graph illustrating errors over time in PUF output with an updated challenge-helper pair for $\tau=1$.

Also, whereas the longevity of systems using a fixed challenge/helper and response is directly limited to the hardware's increase in error rate due to aging, by continuously updating the pair in each time period, the error rate can be nominally reset to zero. That is, periodically refreshing the pair ($c_i^{(\tau)}$, helper$_i^{(\tau)}$) during each time period $\tau$ links the PUF output to the current state of the hardware, eliminating the hardware drift from previous time periods. In that regard, FIG. 11 illustrates the device recovering its share at time $\tau=1$ using the original challenge-helper pair $\{c_i^{(0)}, \text{helper}_i^{(0)}\}$ from time $\tau=0$ using Algorithm 2: PUF-Retrieve. The device then internally generates a new challenge-helper pair $\{c_i^{(1)}, \text{helper}_i^{(1)}\}$ for time period $\tau=1$. The share is then stored by running Algorithm 1: PUF-Store using the new challenge-helper pair for $\tau=1$. This links the updated challenge-helper pair to the current state of the hardware, which eliminates the hardware aging that occurred during time period $\tau \in [0, 1)$. Thus, the expected number of bit errors in the PUF output at time $\tau=1$ is zero despite the hardware continuing to age according to rate $\rho$.

Figure 12:
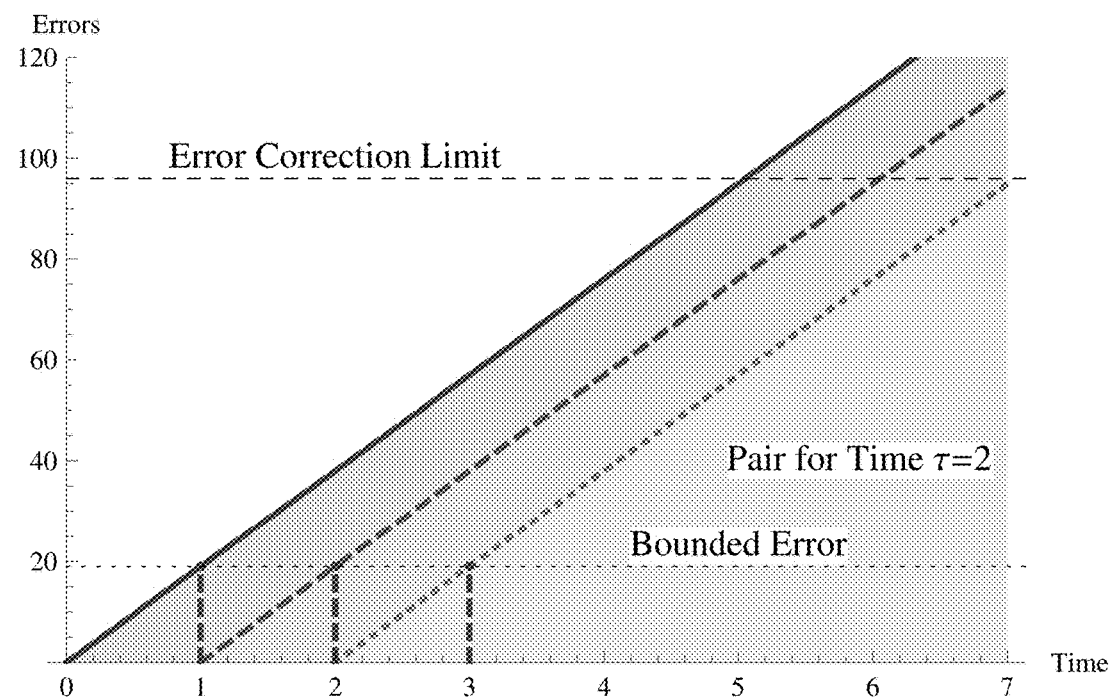
FIG. 12 is a graph illustrating errors over time in PUF output, with pair refreshing establishing a bounded PUF error rate.

As can be seen in FIG. 12, by repeating this process of periodically updating the internal challenge-helper pair of each PUF core, the maximum PUF output error can be bounded and made arbitrarily small by adjusting the refresh cycle period. Thus, a gradual shift in the PUF mapping is inconsequential. So long as the hardware has not fatally aged during the time between, the shift will be continuously factored into the stored challenge and helper data.

Dynamic Membership

The dynamic nature of shares in this construct also permits an embodiment in which the number of participants n participating in a group can be varied dynamically so that participants may join or leave the set of participants in the (t, n) threshold system. In this case, up to n−t participants can be removed from the set $\mathcal{P}$ simply by leaving them out of the next share refresh protocol. To add a participant $p_j$ to the set of participants, each current participant $p_i$ generates an extra share $n_{ij}$ from their share update polynomial $\delta_i(\bullet)$.

In some embodiments employing dynamic membership (in a (t, n) threshold system) and multi-PUF device(s), the device(s) may be configured to perform a local self-test to ensure it is not nearing the point where it can no longer recover its shares due to hardware aging. A secondary threshold, $\bar{t} < t$ (the maximum number of errors that may be corrected by error correction), may be set for the device such that when $\bar{t}$ errors are observed in the PUF output a transition protocol is initiated. The transition protocol can transfer the ability of a device $d_i$ to perform operations over its private key $p_i^{priv}$ to a different device $d_{j\neq i}$ without recovering $p_i^{priv}$. In the example of a dual-PUF device, when device $d_i$ detects critical hardware aging (e.g., when the PUF errors exceed secondary threshold $\bar{t}$), it runs the share refreshing protocol and increases n: 2→4. Device $d_i$ now possesses the set of shares $\{r_i\}_{1\leq i\leq 4}$, and privately sends $ENC_j\{r_i\}_{3\leq i\leq 4}$ to $d_j$ after verifying that $d_j$ is valid (e.g., verify the signature from a trusted source on $d_j$'s enrollment token and have $d_j$ perform a zero knowledge proof). Once $d_j$ has received the set $\{r_i\}_{3\leq i\leq 4}$, both $d_i$ and $d_j$ may act as $d_i$, and in the event of a hardware failure of $d_i$, it can be easily replaced by $d_j$.

The internal self-test procedure may be easily extended to the setting where multiple PUF-enabled devices are used as part of a larger system (e.g., a processing center as discussed below). When one PUF-enabled device fails to recover its share, it can be replaced with a new device. The remaining and correctly functioning PUF-enabled devices run the share update algorithm and increase n by sending the new device shares as well. This allows systems composed of multiple PUF-enabled devices to continue acting as a single entity, as failing devices can be immediately replaced and provisioned with shares of the global (t, n) threshold system. However, the present invention is equally compatible with other cryptographic bases (e.g., discrete logarithm), and need not employ threshold cryptography.

Threshold Symmetric Operations

In addition to asymmetric operations, symmetric cryptographic operations may also be performed in a threshold manner (e.g., Nikova et al., "Threshold Implementations Against Side-Channel Attacks and Glitches," *Information and Communications Security*, volume 4307 of *Lecture Notes in Computer Science*, pages 529-545, Springer Berlin Heidelberg, 2006; Moradi et al., "Pushing the Limits: A Very Compact and a Threshold Implementation of AES," *Advances in Cryptology—EUROCRYPT* 2011, volume 6632 of *Lecture Notes in Computer Science*, pages 69-88, Springer Berlin Heidelberg, 2011; Bilgin et al., "A More Efficient AES Threshold Implementation," Cryptology ePrint Archive, Report 2013/697, 2013). Thus all cryptographic operations, asymmetric and symmetric, can be performed over threshold shares rather than the private key. As with the refreshing process described for shares of an asymmetric private key, the shares of a symmetric key may also be refreshed.

Reconfigurable PUFs

A reconfigurable PUF ('RPUF') can be altered to generate a new challenge-response mapping that is different from (and ideally unrelated to) its prior mapping; the reconfiguration may be reversible (as may be the case in logical RPUFs) or irreversible (as in physical RPUFs). (See, e.g., Majzoobi et al., "Techniques for Design and Implementation of Secure Reconfigurable PUFs," *ACM Transactions on Reconfigurable Technology Systems*, volume 2, no. 1:5:1-5:33, 2009; Kursawe et al., "Reconfigurable Physical Unclonable Functions—Enabling technology for tamper-resistant storage," *IEEE International Workshop on Hardware-Oriented Security and Trust*, 2009. HOST '09., pages 22-29, 2009; Katzenbeisser et al., "Recyclable PUFs: logically reconfigurable PUFs," *Journal of Cryptographic Engineering*, volume 1, no. 3:177-186, 2011; Eichhorn et al., "Logically Reconfigurable PUFs: Memory-based Secure Key Storage," *Proceedings of the Sixth ACM Workshop on Scalable Trusted Computing*, STC '11, pages 59-64, ACM, 2011; Chen, "Reconfigurable physical unclonable function based on probabilistic switching of RRAM," *Electronics Letters*, volume 51, no. 8:615-617, 2015; Horstmeyer et al., "Physically secure and fully reconfigurable data storage using optical scattering," *IEEE International Symposium on Hardware Oriented Security and Trust (HOST)*, 2015, pages 157-162, 2015; Lao et al., "Reconfigurable architectures for silicon Physical Unclonable Functions," *IEEE International Conference on Electro/Information Technology (EIT)*, 2011, pages 1-7, 2011; Zhang et al., "Exploiting Process Variations and Programming Sensitivity of Phase Change Memory for Reconfigurable Physical Unclonable Functions," *IEEE Transactions on Information Forensics and Security*, volume 9, no. 6:921-932, 2014).

Embodiments of the invention may employ RPUFs so as to periodically change an authenticatable device's working values, such as with a single RPUF configured with one parameter to recover sensitive values and another parameter to encode and store correlated values, or with one RPUF to recover sensitive values and another RPUF to encode and store correlated values. Embodiments of the invention may also employ redundant RPUFs to enforce the desired invalidation of a device's working values (such as challenge-helper pairs) correlated to sensitive values (a secret or shares thereof).

In one embodiment, an authenticatable device may be provided with a single reconfigurable PUF e.g., a logically-reconfigurable PUF having a reversible configuration process, and e.g., a (2, 2) threshold sharing employed. The PUF configuration is controlled by a parameter, which may be stored locally on the device. Using parameter a to recover one share, a new parameter b is chosen (preferably randomly), the PUF is reconfigured, and the refreshed share is translated into a correlated challenge-helper pair for storage using the PUF configured with parameter b. The PUF is then reconfigured using parameter a to recover the second share, which is subsequently refreshed and translated into a correlated challenge-helper pair for storage using the PUF configured with parameter b. Now, original PUF parameter a is deleted, and the next round will select a new parameter c to replace parameter b. Alternatively, a separate RPUF $PUF_i$ could be employed for each share $s_i$, where, e.g., $i\in\{0, 1\}$ for a (2, 2) threshold sharing. Using parameter $a_i$ to recover share $s_i$ using $PUF_i$, parameter $a_i$ may then be deleted. A new parameter $b_i$ is chosen (preferably randomly), $PUF_i$ is reconfigured using $b_i$, and the refreshed share $s_i$ is translated into a correlated challenge-helper pair for storage using $PUF_i$ configured with parameter $b_i$. As another alternative, rather than a threshold sharing construction, the value stored and recovered could instead be an undivided value (e.g., a secret).

In another embodiment, an authenticatable device can be provided with two reconfigurable PUF circuits PUF-A and PUF-B preferably having a non-reversible reconfiguration process, and a (2, 2) threshold sharing employed. After each share is recovered using PUF-A and refreshed, it is translated into a correlated challenge-helper pair for storage using PUF-B. Once both refreshed shares have been stored using PUF-B, the reconfiguration process is applied to PUF-A, such that PUF-A now exhibits a new PUF mapping. The next time the shares are recovered, the same procedure is performed using PUF-B for recovery and PUF-A for encoding and storage. Alternatively, a separate pair of RPUFs {PUF-$A_i$, PUF-$B_i$} could be employed for each share $s_i$, where, e.g., $i\in\{0,1\}$ for a (2, 2) threshold sharing. Share $s_i$ is recovered using PUF-$A_i$. Share $s_i$ is refreshed, and the reconfiguration process is applied to PUF-$A_i$, such that PUF-$A_i$ now exhibits a new PUF mapping. Share $s_i$ is then stored using PUF-$B_i$. The next time share $s_i$ is recovered, the same procedure is performed using PUF-$B_i$ for recovery and PUF-$A_i$ for encoding and storage. As another alternative, rather than a threshold sharing construction, the value stored and recovered could instead be an undivided value (e.g., a secret).

Figure 13:
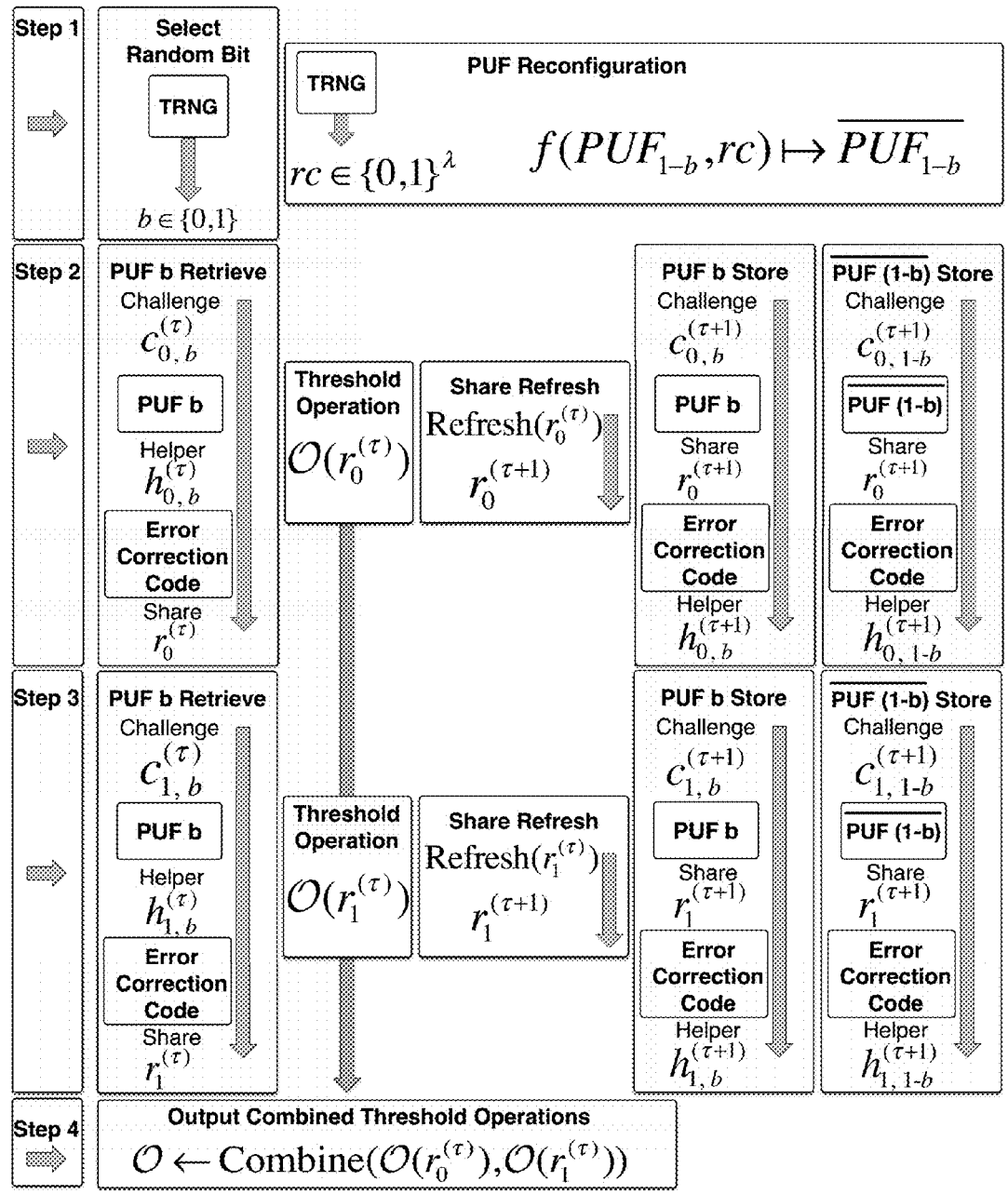
FIG. 13 is an operational flowchart of threshold cryptographic operations in a device having redundant reconfigurable PUFs.

With reference to FIG. 13, in still another embodiment, an authenticatable device can be provided with two (or more) redundant RPUFs (which are preferably irreversibly reconfigurable, such as physically-reconfigurable PUFs) and be configured such that one of the RPUFs ($PUF_{1-b} \in \{0,1\}$) is (preferably randomly) selected upon power-up for reconfiguration while the other RPUF's mapping remains unchanged and is used to recover shares from the device's stored challenge-helper values. (If more than two redundant RPUFs are provided, at least one but not all of the RPUFs would be reconfigured.) Parameterizing the preceding PUF-Store and PUF-Retrieve algorithms, Algorithms 14 and 15 now use a specific $PUF_b$ to store or retrieve, respectively, a value $V_i$. (Again, rather than a threshold sharing construction as illustrated in FIG. 13, in other variations of this embodiment of the invention, the value stored and recovered could instead be an undivided value (e.g., a secret). As another alternative, a separate pair of RPUFs ($PUF_{1-b}{}^i$, $b \in \{0, 1\}$) could be employed for each share $s_i$, where, e.g., $i \in \{0, 1\}$ for a (2, 2) threshold sharing, with each share $s_i$ being encoded and stored with both $PUF_{1-b}{}^i$ and $PUF_b{}^i$, and one of $PUF_{1-b}{}^i$ or $PUF_b{}^i$ being selected upon power-up for reconfiguration while the other remains unchanged and is used to recover share $s_i$.).

---

Algorithm 14 PUF-Store

---

Goal: Store value $V_i$
for PUF Device d do
    Select finite field $\mathbb{F}_n$ of order n
    Select E, an elliptic curve over $\mathbb{F}_n$
    Find $G \in E/\mathbb{F}_n$, a group generator
    for PUF b do
        Select challenge $c_{i,b} \in \mathbb{F}_n$ uniformly at random
        $x = H(c_{i,b}, E, G, n)$
        $O = PUF_b(x)$
        $helper_{i,b} = P_{i,b} = O \oplus ECC(V_i)$
        Write $\{c_{i,b}, helper_{i,b}\}$ to non-volatile memory
    end for
end for

---

Algorithm 15 PUF-Retrieve

---

Goal: Retrieve value $V_i$
for PUF Device d do
    for PUF b do
        Read $\{c_{i,b}, helper_{i,b}\}$ from non-volatile memory
        $x \leftarrow H(c_{i,b}, E, G, n)$
        $O' = PUF_b(x)$
        $V_i \leftarrow D((ECC(V_i) \oplus O) \oplus O')$
    end for
end for

---

When Algorithm 14 is run during the device's initial power-on, there are no challenge-helper pairs stored in non-volatile memory. Thus, the fact that $PUF_b$ will be selected for reconfiguration (cf. FIG. 13 Step 1) has no effect, as no challenge-helper pairs have been generated with any of the PUFs. However, once Algorithm 14 has been run, subsequent device power-on's will eliminate the usable correlation of one challenge-helper pair to a share through the (preferably random) reconfiguration of one of the RPUFs.

Referring again to FIG. 13, at Step 1 the device is powered on, and the true random number generator (TRNG) selects a bit $b \in \{0, 1\}$ uniformly at random. This bit is used to select $PUF_b \in \{PUF_0, PUF_1\}$ for reconfiguration. As one exemplary means of reconfiguration, the TRNG can also be queried for an ephemeral reconfiguration string $rc \in \{0, 1\}^\lambda$ (where $\lambda$ is the number of bits in the string and is preferably large enough such that the space is intractable for adversaries, e.g., $\lambda=128$) and PUF reconfiguration function $f(PUF_{1-b}, rc) \mapsto \overline{PUF_{1-b}}$ applied to $PUF_{1-b}$ using reconfiguration string $rc$ to result in a new $\overline{PUF_{1-b}}$ mapping where responses for a fixed challenge c input to $PUF_{1-b}$ and $\overline{PUF_{1-b}}$ will yield responses t-distant, t being the error correcting code threshold. Thus, the putative correlated response resulting from the challenge to $\overline{PUF_{1-b}}$ is not usably correlated to the share due to its reconfiguration from previous state $PUF_{1-b}$. This step need only occur on device power-on, as the current challenge-helper pairs can be maintained in volatile memory (which is preferably protected by the tamper sensitivity of the PUF), and written to non-volatile memory to ensure state recovery in the event of loss of power. That is, once powered on and Step 1 completes, the device can preferably be configured so that it need not read the challenge-helper pairs from non-volatile memory, only writing to ensure state recovery in the event of power loss.

As $\overline{PUF_{1-b}}$ has been reconfigured, the challenge-helper pairs $\{c_{i,1-b}{}^{(\tau)}, h_{i,1-b}{}^{(\tau)}\}$ generated using the unmodified $PUF_{1-b}$'s responses are not correlated to the shares, as the PUF reconfiguration function $f(\cdot, \cdot)$ outputs a new PUF configuration that is t-distant from its argument. Thus, share recovery is performed using $PUF_b$, which remains unmodified (FIG. 13 Steps 2-3) and its responses usably correlated to the shares through the challenge-helper pairs stored in memory. After the shares have been refreshed to their new representations $r_i{}^{(\tau+1)}$, challenge-helper pairs correlated to the shares are preferably generated using both $PUF_b$ and $PUF_{1-b}$, so that if the device is power-cycled, the shares can be recovered using whichever PUF is not selected for reconfiguration. (In an alternate embodiment with more than two redundant RPUFs, a minimum of one would need to remain unreconfigured). Finally, the intermediate threshold operations over each share $\mathcal{O}(r_i{}^\tau)$ are combined into the final cryptographic output $\mathcal{O}$ (FIG. 13 Step 4). The boot/reconfiguration operations outlined in FIG. 13 are set forth in pseudo-code in Algorithm 16.

---

Algorithm 16 Reconfig-Boot

---

Goal: Perform threshold operation $\mathcal{O}$
Assume: PUF-DKG has been executed by PUF Device d
for Server s do
    Issue Command $\mathcal{O}$ and Auxiliary Information Aux
end for
for Device d do
    Power On
    $b \in \{0, 1\} \leftarrow TRNG$
    $rc \in \{0,1\}^\lambda \leftarrow TRNG$
    $\overline{PUF_{1-b}} \leftarrow reconfig(PUF_{1-b}, rc)$
    for each share $r_i{}^{(\tau)}$ do
        PUF-Share-Update-Preparation
    end for
    for each challenge $c_{i,b}{}^{(\tau)}$ (Challenge $c = c_{0,b}{}^{(\tau)} \| \ldots \| c_{n,b}{}^{(\tau)}$) do
        Read challenge $c_{i,b}{}^{(\tau)}$ and helper data $h_{i,b}{}^{(\tau)}$
        Recover share $r_i{}^{(\tau)} \leftarrow$ PUF-Retrieve($PUF_b, c_{i,b}{}^{(\tau)}, h_{i,b}{}^{(\tau)}$)
        Perform threshold operation $\mathcal{O}(r_i{}^{(\tau)}, Aux)$
        Update share
            $r_i{}^{(\tau+1)} \leftarrow$ PUF-Share-Update-Application($r_i{}^{(\tau)}$)
        Store $r_i{}^{(\tau+1)}$ and update PUF challenge:
            $\{c_{i,b}{}^{(\tau+1)}, helper_{i,b}{}^{(\tau+1)}\} \leftarrow$ PUF-Store($PUF_b, r_i{}^{(\tau+1)}$)
            $\{c_{i,1-b}{}^{(\tau+1)}, helper_{i,1-b}{}^{(\tau+1)}\} \leftarrow$ PUF-Store($\overline{PUF_{1-b}}, r_i{}^{(\tau+1)}$)
    end for

Algorithm 16 Reconfig-Boot

```
    Combine threshold operations 𝒪 ← Combine({𝒪(r_i^(τ), Aux)}_{0≤i≤n})
    return Result 𝒪
  end for
  for Server s do
    Process operation 𝒪
  end for
```

The TRNG and variables not stored in non-volatile memory are preferably protected by the tamper sensitivity property of the PUF, so that an adversary cannot bias the TRNG or alter the bit b selected on power-on. In that regard, reconfigurable PUFs have been demonstrated as a viable protection mechanism for non-volatile memory (see, e.g., Kursawe et al., supra).

It is noted that if the device of the foregoing embodiment loses power before storing in memory updated challenge-helper pairs using both the unmodified and reconfigured PUF, when it is powered up the unmodified PUF may be selected for reconfiguration and the shares will be unrecoverable. To preclude that possibility, a pair of backup PUFs may be employed, with a set of corresponding challenge-helper pairs generated for each of the backup PUFs. If the primary pair of PUFs are unable to regenerate the shares (e.g., the device performs a test by comparing its regenerated public key against the original stored in non-volatile memory), the backup pair is invoked. The same general approach that is used for the primary PUF pair is followed, where the device randomly reconfigures one of the backup PUFs before attempting share reconstruction.

More specifically, on power-up, the device proceeds as in FIG. 13 Step 1. After regenerating the shares (which may be incorrect if both primary PUFs have been reconfigured) the device regenerates its putative public key and compares it against a copy stored in non-volatile memory (generated during the original distributed key generation process). If the putative regenerated public key and the stored public key differ (indicating the share recovery may have failed due to a benign power-cycle event that resulted in the reconfiguration of both primary PUFs), the device initiates the backup protocol and invokes the backup PUF pair. The TRNG selects a bit $b \in \{0, 1\}$ uniformly at random. This bit is used to select backup $PUF_b \in \{PUF_0, PUF_1\}$ for reconfiguration, and, e.g., the TRNG is queried for an ephemeral reconfiguration string $rc \in \{0, 1\}^\lambda$ (where $\lambda$ is the number of bits in the string and is preferably large enough such that the space is intractable for adversaries, e.g., $\lambda=128$). The PUF reconfiguration function $f(PUF_{1-b}, rc) \mapsto \overline{PUF_{1-b}}$ is applied to backup $PUF_{1-b}$ using reconfiguration string rc to result in a new $\overline{PUF_{1-b}}$ mapping, where responses for a fixed challenge c input to $PUF_{1-b}$ and $\overline{PUF_{1-b}}$ will yield responses t-distant, where t is the error correcting code threshold.

As backup $\overline{PUF_{1-b}}$ has been reconfigured, the backup challenge-helper pairs $\{c_{i,1-b}^{(\tau)}, h_{i,1-b}^{(\tau)}\}$ generated using the unmodified backup $PUF_{1-b}$ will no longer recover the shares, so share recovery is performed using backup $PUF_b$, which remains unmodified. After the shares $r_i^{(\tau)}$ have been refreshed to their new representations $r_i^{(\tau+1)}$, a challenge-helper pair is generated using both backup $PUF_b$ and backup $PUF_{1-b}$, as well as primary $PUF_b$ and primary $PUF_{1-b}$. This allows the device to return to relying on the primary PUF pair, which were both reconfigured without storing corresponding challenge-helper pairs due to power cycle events. The device has now returned to a state where the primary PUF pair can be successfully invoked on power on, and the backup PUF pair can complete system recovery in the event of a power cycle event that reconfigures both of the primary PUFs. Finally, the intermediate threshold operations over each share $\mathcal{O}(r_i^\tau)$ are combined into the final cryptographic output $\mathcal{O}$.

In one embodiment, instantiating four physically reconfigurable PUFs (P-RPUFs) can be achieved using phase change memory (PCM), which is a candidate replacement for Flash and DRAM and, if adopted, would be common to many architectures. A P-RPUF can be instantiated using PCM (Kursawe et al., "Reconfigurable Physical Unclonable Functions—Enabling technology for tamper-resistant storage," *IEEE International Workshop on Hardware-Oriented Security and Trust*, 2009. HOST '09., pages 22-29, 2009), and four P-RPUFs can be instantiated on one device by dividing the entire memory space into four blocks.

Scalability

Figure 14:
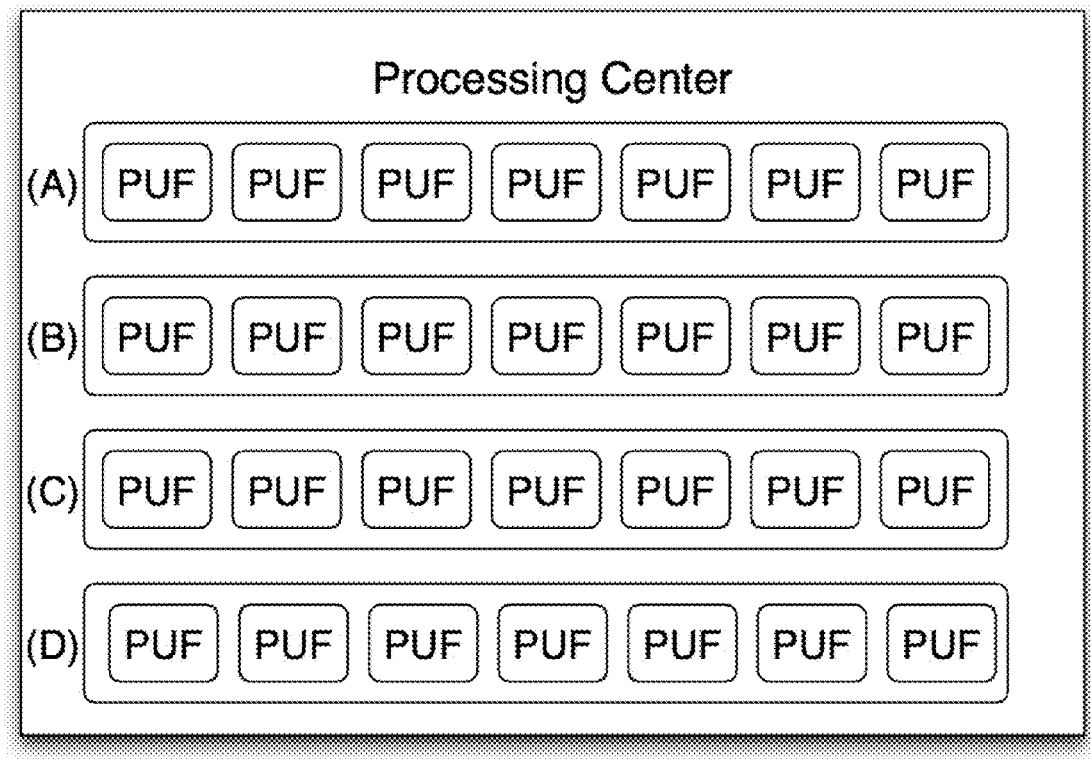
FIG. 14 is a diagram depicting a batch PUF processing center.

Standard PUF protocols are inherently linked to a specific hardware device (indeed, this is their goal), which can impose a constraint on the ability to readily scale a system to support an arbitrary processing load. FIG. 14 illustrates a processing center designed to scale to support an arbitrarily large processing load with PUFs employed to dynamically regenerate private information. By constructing a (t, n) sharing of a secret through distributed key generation, the private key for the system is never constructed or stored. However, any t PUFs can collaborate to perform cryptographic operations on behalf of the processing center. For example, if t=7, each row of PUFs can jointly perform a cryptographic operation on behalf of the processing center, and four requests (using rows A through D) can be completed simultaneously. Thus, scalable hardware-intrinsic identity solutions can be designed in which a group of hardware components with local hardware-intrinsic identity (e.g., equipped with a PUF) are able to act cooperatively to form a unique hardware-intrinsic identity for their group as a whole. This embodiment of the invention does not require the devices that compose the system to implement threshold cryptography locally. Rather, each device could run Algorithm 3 and publicize its local public key $p_i^{priv}$. The (t, n) sharing is then set up for the system, using each device's local public key for private communication.

Figure 15:
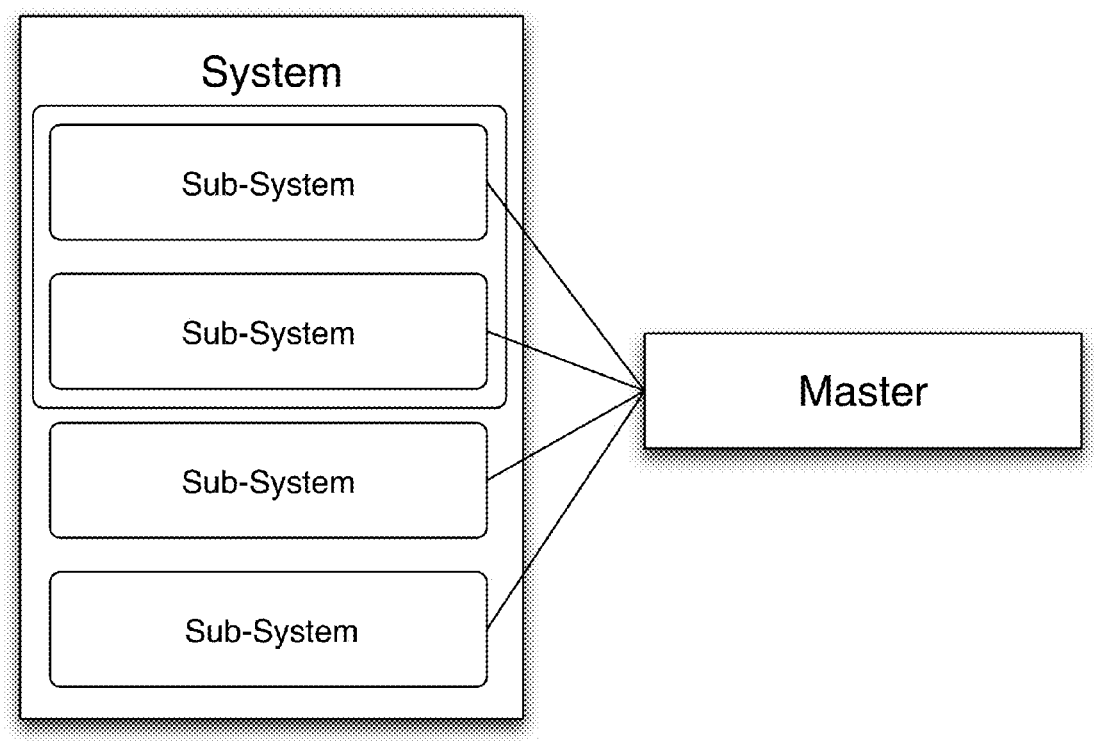
FIG. 15 is a diagram depicting joint identity from composite elements.

FIG. 15 illustrates a Master identity being generated from a set of component identities. An (n, n) threshold system could be constructed to require that all components are able to recover their shares in order to perform cryptographic operations using the Master identity. In another embodiment of the invention, a (t, n) threshold system could be constructed to require that all of the critical components and some of the non-critical components are able to recover their shares in order to perform cryptographic operations using the Master identity.

What is claimed is:

1. An authenticatable device comprising:
   at least a first and second reconfigurable physical unclonable function ('RPUF') circuits constructed to generate, in response to input of a challenge, an output value that is characteristic to the RPUF circuit, a configuration of the RPUF circuit, and the challenge;
   a memory;
   one or more processors configured to:
   cause an RPUF circuit to be reconfigured responsive to powering up the authenticatable device;
   cause a challenge to be issued to the RPUF circuits;
   store in the memory a putative value or values that corresponds to a respective RPUF circuit's response, wherein at least the putative value or values corresponding to the RPUF circuit that was not reconfigured in response to the power event is correlated to a secret or a share of a secret;

responsive to a request to perform a cryptographic operation, cause a challenge to be issued at least to the RPUF circuit that was not reconfigured generate an executable version of the secret or the share of a secret using the RPUF circuit's response with the putative correlated value or values that was stored for that RPUF circuit.

2. The authenticatable device of claim 1, wherein the one or more processors is configured to cause a challenge to be issued responsive to the request to perform the cryptographic operation only to the RPUF circuit that was not reconfigured to cause a challenge to be issued only to the RPUF circuit that was not reconfigured.

3. The authenticatable device of claim 1, wherein the secret or a share of a secret is a share of a secret, and the one or more computing processors is further reconfigured to cause a challenge to be issued, store in the memory the putative value or values, and responsive to the request to perform the cryptographic operation, cause a challenge to be issued as many times as there are shares of the secret.

4. The authenticatable device of claim 3, wherein the one or more computing processors is further configured to periodically refresh the shares of the secret.

5. The authenticatable device of claim 1, wherein each RPUF circuit is irreversibly reconfigurable.

6. The authenticatable device of claim 5, wherein each RPUF circuit is physically reconfigurable.

7. The authenticatable device of claim 1, wherein the first and second RPUF circuits are logically reconfigurable.

8. The authenticatable device of claim 7, further comprising a random number generator wherein the random number generator is a true random number generator.

9. The authenticatable device of claim 1, wherein the memory is non-volatile.

10. The authenticatable device of claim 9, wherein each putative correlated value or values is a challenge-helper pair.

11. The authenticatable device of claim 1, further comprising a random number generator, wherein the processor is further configured to store in a volatile memory a random number for use in selecting which RPUF circuit to reconfigure.

12. The authenticatable device of claim 1, further comprising a backup RPUF circuit for each RPUF circuit.

13. The authenticatable device of claim 12, further comprising a non-volatile memory, wherein the one or more computing processors is configured to store a public key for the device in the non-volatile memory and to, upon power-up, generate a putative public key using the memory and the RPUF circuit not reconfigured, and engage the backup RPUF circuits if the putative public key thus generated does not match the device's stored public key.

14. The authenticatable device of claim 1, wherein the executable version of the secret or the share of a secret comprises the secret or the share of the secret or a combination of threshold operations on the secret or the share of the secret.

15. A computer implemented method for authenticating a device with reconfigurable physical unclonable function ('RPUF') circuits, the method comprising:

reconfiguring, by at least one processor, an RPUF circuit responsive to powering up the device;

issuing, the at least one processor, to a first and second RPUF circuits, wherein the RPUF circuits are constructed to generate, in response to input of a challenge, an output value that is characteristic to the RPUF circuit, a configuration of the RPUF circuit, and the challenge;

storing, by the at least one processor, in a memory a putative value or values that corresponds to a respective RPUF circuit's response, wherein at least the putative value or values corresponding to the RPUF circuit that was not reconfigured in response to the power event is correlated to a secret or a share of a secret;

responsive to receiving a request to perform a cryptographic operation, causing, by the at least one processor, a challenge to be issued at least to the RPUF circuit that was not reconfigured; and enabling, by the at least one processor, the cryptographic operation associated with the secret or the share of the secret using at least the response generated by the RPUF circuit that was not reconfigured and the putative value or values stored for that RPUF circuit.

16. The method of claim 15, wherein the secret or the share of a secret is not generated in the memory.

17. The method of claim 15, further comprising an act of refreshing the shares of the secret.

18. The method of claim 15, wherein the act of causing, by the at least one processor, the challenge to be issued at least to the RPUF circuit that was not reconfigured, includes only causing the challenged to be issued to the RPUF circuit that was not reconfigured.

19. An authenticatable server comprising:

at least a first and second reconfigurable physical unclonable function ('RPUF') circuits constructed to generate, in response to input of a challenge, an output value that is characteristic to the RPUF circuit, a configuration of the RPUF circuit, and the challenge;

a memory;

one or more processors configured to:
   cause an RPUF circuit to be reconfigured responsive to powering up the server;
   issue a challenge to the RPUF circuits;
   store in the memory a putative value or values that corresponds to a respective RPUF circuit's response, wherein at least the putative value or values output by the RPUF circuit that was not reconfigured in response to the event, is correlated to a secret or a share of a secret; and
   responsive to a request to perform a cryptographic operation, cause a challenge to at least the RPUF circuit that was not reconfigured, and enable the cryptographic operation associated with the secret or the share of the secret using at
least the response generated by the RPUF circuit that was not reconfigured and the putative value or values stored for that RPUF circuit.

20. The authenticable system of claim 18, wherein the secret or the share of a secret is not generated in the memory.

* * * * *